US011970850B2

(12) United States Patent
Scott et al.

(10) Patent No.: US 11,970,850 B2
(45) **Date of Patent: *Apr. 30, 2024**

(54) SEWER CLEANING MACHINE

(71) Applicant: MILWAUKEE ELECTRIC TOOL CORPORATION, Brookfield, WI (US)

(72) Inventors: John S. Scott, Brookfield, WI (US); Scott T. Moeller, Richfield, WI (US); Christopher S. Jones, Milwaukee, WI (US); William D. Stoneback, Wauwatosa, WI (US); Warren G. Corrado, Waterford, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,339

(22) Filed: Dec. 21, 2022

(65) Prior Publication Data

US 2023/0125817 A1 Apr. 27, 2023

Related U.S. Application Data

(62) Division of application No. 16/889,999, filed on Jun. 2, 2020, now Pat. No. 11,603,653, which is a division (Continued)

(51) Int. Cl.

*B08B 9/02* (2006.01)
*B08B 9/04* (2006.01)

(Continued)

(52) U.S. Cl.

CPC ................ *E03F 9/005* (2013.01); *B08B 9/04* (2013.01); *B08B 9/045* (2013.01); *B08B 9/02* (2013.01)

(58) Field of Classification Search

CPC .................................. B08B 9/04; B08B 9/02

See application file for complete search history.

(56) References Cited

U.S. PATENT DOCUMENTS

| | | | |
|---|---|---|---|
| 1,783,256 | A | 12/1930 | Miller |
| 1,918,353 | A | 7/1933 | Utley |

(Continued)

FOREIGN PATENT DOCUMENTS

| | | | |
|---|---|---|---|
| CN | 201834082 | U | 5/2011 |
| CN | 201836655 | U | 5/2011 |

(Continued)

OTHER PUBLICATIONS

Wesco Industrial Products Inc, "Stairking Replacement Parts List", Issued Oct. 5, 2006 (1 page).

(Continued)

*Primary Examiner* — Michael D Jennings
(74) *Attorney, Agent, or Firm* — Michael Best & Friedrich LLP

(57) ABSTRACT

A sewer cleaning machine includes a frame, a drum rotatably supported by the frame, and a motor supported by the frame and coupled to the drum. The drum includes a cable that is selectively extendable out of the drum. The motor is operable to rotate the drum. The drum is configured to engage a surface to facilitate moving the sewer cleaning machine along the surface.

19 Claims, 14 Drawing Sheets

Related U.S. Application Data of application No. 15/795,907, filed on Oct. 27, 2017, now Pat. No. 10,704,250.

(60) Provisional application No. 62/442,502, filed on Jan. 5, 2017, provisional application No. 62/414,312, filed on Oct. 28, 2016.

(51) Int. Cl.
*B08B 9/045* (2006.01)
*E03F 9/00* (2006.01)

(56) References Cited

U.S. PATENT DOCUMENTS 1,990,686 A 2/1935 Einhorn et al.
2,069,871 A 2/1937 Blanc
2,111,527 A 3/1938 Blanc
2,115,266 A 4/1938 Johnson
2,167,268 A 7/1939 Sanger
2,223,005 A 11/1940 Kerber
2,225,129 A 12/1940 Osborn
2,244,735 A 6/1941 Siverman
2,246,056 A 6/1941 McKenzie
2,255,800 A 9/1941 Miller
2,267,493 A 12/1941 Clotz
2,282,600 A 5/1942 Blanc
2,288,771 A 7/1942 Babcock
2,291,253 A 7/1942 Osborn
2,355,733 A 8/1944 Johnson et al.
2,426,265 A 8/1947 Gavin
2,466,493 A 4/1949 Sketchley
2,468,490 A 4/1949 Joseph
2,552,808 A 5/1951 O'Brien
2,562,574 A 7/1951 Poekert
2,610,807 A 9/1952 O'Brien
2,619,665 A 12/1952 Hopkins et al.
2,730,740 A 1/1956 O'Brien
2,765,149 A 10/1956 Christodolu
2,786,218 A 3/1957 Yousem
2,836,838 A 6/1958 Kollmann
2,880,435 A 4/1959 Deutsch et al.
2,926,372 A 3/1960 O'Brien
2,930,584 A 3/1960 Hensley et al.
2,955,307 A 10/1960 Hunt
3,007,186 A 11/1961 Olsson
3,025,547 A 3/1962 Ciaccio
3,048,870 A 8/1962 Criscuolo
3,075,217 A 1/1963 Kollmann
3,086,234 A 4/1963 Crane
3,118,159 A 1/1964 Kollmann
3,134,119 A 5/1964 Criscuolo
3,149,480 A 9/1964 Hunt
3,159,861 A 12/1964 Sarcone
3,162,878 A 12/1964 Agostino
3,206,782 A 9/1965 Larsen
3,246,354 A 4/1966 Cooney et al.
3,254,851 A 6/1966 Caperton
3,283,353 A 11/1966 Kirk
3,298,051 A 1/1967 Ratliff
3,330,533 A 7/1967 Blume
3,372,417 A 3/1968 Devine
3,397,420 A 8/1968 Schneider
3,414,926 A 12/1968 Bloom
3,449,003 A 6/1969 Hunt
3,451,089 A 6/1969 Carlson et al.
3,451,090 A 6/1969 Presti et al.
3,457,580 A 7/1969 Meyers
3,469,273 A 9/1969 Caperton
3,544,051 A 12/1970 Norman
3,561,034 A 2/1971 Caperton
3,605,158 A 9/1971 Russell
3,691,583 A 9/1972 Silverman et al.
3,706,110 A 12/1972 Siegal
3,740,785 A 6/1973 Latall
3,747,153 A 7/1973 O'Neill
3,885,148 A 3/1975 Di Benedetto
3,882,565 A 5/1975 Irwin et al.
3,897,602 A 8/1975 Waterbury
3,928,885 A 12/1975 Peterson et al.
3,950,934 A 4/1976 Irwin
3,958,293 A 5/1976 Irwin
4,042,305 A 8/1977 Vincent
4,069,534 A 1/1978 Martin
4,104,757 A 8/1978 Silverman
4,153,966 A 5/1979 Irwin
4,188,683 A 2/1980 Klunder
4,218,802 A 8/1980 Babb et al.
4,244,072 A 1/1981 Dunham et al.
4,280,852 A 7/1981 Dunham et al.
4,284,931 A 8/1981 Ehret
4,290,162 A 9/1981 Agostino
4,292,704 A 10/1981 Joanis, Sr.
4,356,557 A 10/1982 Bell et al.
4,364,139 A * 12/1982 Babb ....................... E03F 9/005 15/104.33
4,395,791 A 8/1983 Irwin
4,403,885 A 9/1983 Babb
2,661,489 A 12/1983 Rudolph et al.
4,420,852 A 12/1983 Bowlsby
4,464,806 A 8/1984 Prange
4,508,468 A 4/1985 Irwin
4,540,017 A 9/1985 Prange
4,566,551 A 1/1986 Feliz
4,570,281 A 2/1986 Boelens
4,580,306 A 4/1986 Irwin
4,611,360 A 9/1986 Irwin
4,644,603 A 2/1987 Meyer
4,686,732 A 8/1987 Irwin
4,692,957 A 9/1987 Kovacs
4,700,422 A 10/1987 Russell
4,716,613 A 1/1988 Irwin
4,771,500 A 9/1988 Kovacs
4,773,113 A 9/1988 Russell
4,774,739 A 10/1988 Sherman, Jr.
4,887,929 A 12/1989 Hale
4,914,775 A 4/1990 Kirk
4,916,772 A 4/1990 Russell et al.
4,919,558 A 4/1990 Mascitelli et al.
4,926,518 A 5/1990 Mikol
4,943,182 A 7/1990 Hoblingre
4,956,889 A 9/1990 Kirk
5,009,242 A 4/1991 Prange
5,029,356 A 7/1991 Silverman et al.
5,031,263 A 7/1991 Babb et al.
5,031,276 A 7/1991 Babb et al.
5,056,176 A 10/1991 Belcher
5,181,668 A 1/1993 Tsuji et al.
5,182,833 A 2/1993 Yamaguchi et al.
5,193,242 A 3/1993 Irwin
5,199,129 A 4/1993 Salecker et al.
5,222,270 A * 6/1993 Sloter ..................... E03F 9/005 226/11
5,226,207 A 7/1993 Elzaurdia
5,230,116 A 7/1993 Rodriguez
5,239,724 A 8/1993 Salecker et al.
5,309,595 A * 5/1994 Salecker ................. E03F 9/005 15/257.01
5,329,662 A 7/1994 Salecker
5,335,388 A 8/1994 Salecker
5,390,389 A 2/1995 Rutkowski et al.
5,418,997 A 5/1995 DeFrange
5,440,216 A 8/1995 Kim
5,507,062 A 4/1996 Salecker
5,526,975 A 6/1996 Endo
5,535,473 A 7/1996 Maniar
5,588,171 A 12/1996 Hamann
5,618,123 A 4/1997 Pulse
5,622,319 A 4/1997 Babb et al.
5,636,648 A 6/1997 O'Brien et al.
5,640,736 A 6/1997 Salecker
5,657,505 A 8/1997 Gallagher et al.
5,755,002 A 5/1998 Lacy
5,768,741 A 6/1998 Leiman et al.
5,862,561 A 1/1999 Irwin

(56) References Cited

U.S. PATENT DOCUMENTS

| | | | | |
|---|---|---|---|---|
| 5,901,401 | A | 5/1999 | Rutkowski et al. | |
| 5,933,903 | A | 8/1999 | Irwin | |
| 5,987,683 | A | 11/1999 | Leiman et al. | |
| 5,996,159 | A | 12/1999 | Irwin | |
| 6,009,588 | A | 1/2000 | Rutkowski | |
| 6,040,660 | A | 3/2000 | Schmidt et al. | |
| 6,076,219 | A | 6/2000 | Irwin | |
| 6,158,076 | A | 12/2000 | Rutkowski et al. | |
| 6,243,905 | B1 | 6/2001 | Rutkowski | |
| 6,343,398 | B1 | 2/2002 | Silverman et al. | |
| 6,360,397 | B1 | 3/2002 | Babb | |
| 6,360,757 | B1 | 3/2002 | Bohrer | |
| 6,381,798 | B1 * | 5/2002 | Rutkowski | B08B 9/045 15/104.33 |
| 6,412,136 | B1 * | 7/2002 | Rutkowski | B08B 9/045 226/35 |
| 6,421,871 | B1 | 7/2002 | Peach et al. | |
| 6,457,841 | B1 | 10/2002 | Lynch et al. | |
| 6,532,404 | B2 | 3/2003 | Colens | |
| 6,538,732 | B1 | 3/2003 | Drost et al. | |
| 6,546,582 | B2 | 4/2003 | Silverman | |
| 6,594,849 | B1 | 7/2003 | Nimens | |
| 6,615,436 | B1 | 9/2003 | Burch, Jr. et al. | |
| 6,615,440 | B1 | 9/2003 | Williams | |
| 6,618,892 | B2 | 9/2003 | Schmitt | |
| 6,637,064 | B2 | 10/2003 | Silverman et al. | |
| 6,655,228 | B1 | 12/2003 | Marghrio et al. | |
| 6,745,487 | B1 | 6/2004 | Nield | |
| 6,760,948 | B2 | 7/2004 | Schmitt | |
| 6,898,807 | B2 | 5/2005 | Tash | |
| 6,925,679 | B2 | 8/2005 | Wallach et al. | |
| 6,953,260 | B1 | 10/2005 | Allen | |
| 6,956,348 | B2 | 10/2005 | Landry et al. | |
| 7,007,399 | B2 | 3/2006 | Catalano | |
| 7,009,698 | B2 | 3/2006 | Drost et al. | |
| 7,052,554 | B2 | 5/2006 | Rothenberger | |
| 7,073,224 | B2 | 7/2006 | Schmitt | |
| 7,168,824 | B2 | 1/2007 | Schnell | |
| 7,186,002 | B2 | 3/2007 | Matthews et al. | |
| 7,191,673 | B2 | 3/2007 | Thornhill et al. | |
| 7,222,383 | B2 | 5/2007 | Hale | |
| 7,269,874 | B2 | 9/2007 | Hung | |
| 7,281,815 | B1 | 10/2007 | Gustafson | |
| 7,288,912 | B2 | 10/2007 | Landry et al. | |
| 7,344,270 | B2 | 3/2008 | Kim | |
| 7,367,077 | B2 | 5/2008 | Rutkowski et al. | |
| 7,373,689 | B2 | 5/2008 | Bowden et al. | |
| 7,402,961 | B2 | 7/2008 | Bayat et al. | |
| 7,459,871 | B2 | 12/2008 | Landry et al. | |
| 7,478,451 | B2 | 1/2009 | Rutkowski et al. | |
| 7,480,041 | B2 | 1/2009 | Lindner | |
| 7,549,766 | B2 | 6/2009 | Sharrah et al. | |
| D595,911 | S | 7/2009 | Rutkowski et al. | |
| 7,652,216 | B2 | 1/2010 | Sharrah et al. | |
| 7,674,003 | B2 | 3/2010 | Sharrah et al. | |
| 7,676,879 | B1 | 3/2010 | Rutenberg et al. | |
| 7,685,669 | B2 | 3/2010 | Rutkowski et al. | |
| 7,757,332 | B1 | 7/2010 | Hale | |
| 7,761,948 | B2 | 7/2010 | Irwin | |
| 7,765,626 | B2 | 8/2010 | Sapia | |
| 7,770,253 | B2 | 8/2010 | Ha et al. | |
| 7,810,203 | B2 | 10/2010 | Stolz | |
| 7,888,883 | B2 | 2/2011 | Crawford et al. | |
| 7,889,980 | B2 * | 2/2011 | Sooy | G05B 19/042 396/19 |
| 7,891,038 | B2 | 2/2011 | Hale | |
| 7,935,192 | B2 | 5/2011 | Silverman et al. | |
| 8,046,862 | B2 * | 11/2011 | Eisermann | B65H 61/00 242/563.2 |
| 8,054,459 | B2 | 11/2011 | Lindner | |
| 8,060,968 | B2 | 11/2011 | Babb et al. | |
| 8,091,333 | B2 | 1/2012 | Lee | |
| 8,176,593 | B2 | 5/2012 | Gress et al. | |
| 8,253,368 | B2 | 8/2012 | Landry et al. | |
| 8,261,397 | B2 | 9/2012 | Lee | |
| 8,365,337 | B2 | 2/2013 | Tash | |
| 8,378,613 | B2 | 2/2013 | Landry et al. | |
| 8,386,081 | B2 | 2/2013 | Landry et al. | |
| 8,413,347 | B2 | 4/2013 | Gress et al. | |
| 8,428,778 | B2 | 4/2013 | Landry et al. | |
| 8,434,186 | B2 | 5/2013 | Wildauer et al. | |
| RE44,281 | E | 6/2013 | Snyder | |
| 8,456,125 | B2 | 6/2013 | Landry et al. | |
| 8,458,845 | B1 | 6/2013 | Tabieros | |
| 8,505,146 | B1 | 8/2013 | Jessup | |
| 8,510,891 | B2 | 8/2013 | Fivecoate | |
| 8,529,086 | B2 | 9/2013 | Skrivan et al. | |
| 8,553,340 | B2 | 10/2013 | Drost et al. | |
| 8,584,297 | B2 | 11/2013 | Tash | |
| 8,594,840 | B1 | 11/2013 | Chiappetta et al. | |
| 8,598,829 | B2 | 12/2013 | Landry et al. | |
| 8,615,837 | B2 | 12/2013 | Hale et al. | |
| 8,646,143 | B2 | 2/2014 | Lokkinen | |
| 8,781,626 | B2 | 7/2014 | Landry et al. | |
| 8,817,252 | B2 | 8/2014 | Lindner | |
| 8,826,483 | B2 | 9/2014 | Rutkowski et al. | |
| 8,838,268 | B2 | 9/2014 | Friedman et al. | |
| 8,871,030 | B2 | 10/2014 | Chen et al. | |
| 8,931,131 | B1 | 1/2015 | Feduke | |
| 8,931,973 | B2 | 1/2015 | Olszewski | |
| 8,970,211 | B1 | 3/2015 | Olsson et al. | |
| 8,984,698 | B1 | 3/2015 | Olsson | |
| 9,009,906 | B2 | 4/2015 | Hale et al. | |
| 9,015,889 | B1 | 4/2015 | Khonsary | |
| 9,015,890 | B1 | 4/2015 | Owens | |
| 9,018,848 | B2 | 4/2015 | Garcia | |
| 9,041,794 | B1 | 5/2015 | Olsson et al. | |
| 9,055,848 | B2 | 6/2015 | Liu et al. | |
| 9,060,407 | B2 | 6/2015 | West | |
| 9,080,599 | B2 | 7/2015 | Rutkowski et al. | |
| 9,144,138 | B2 | 9/2015 | Xie | |
| 9,144,361 | B2 | 9/2015 | Landry et al. | |
| 9,173,539 | B2 | 11/2015 | Yoon et al. | |
| 9,194,114 | B2 | 11/2015 | Petry | |
| 9,217,245 | B2 | 12/2015 | Yu | |
| 9,234,342 | B1 | 1/2016 | Beesley et al. | |
| 9,260,847 | B2 | 2/2016 | Silverman et al. | |
| 9,346,085 | B2 | 5/2016 | Khani Moghanaki | |
| 9,402,524 | B2 | 8/2016 | Yoon et al. | |
| 9,414,731 | B2 | 8/2016 | Soejima | |
| 9,456,182 | B2 | 9/2016 | Stenson | |
| 9,526,390 | B2 | 12/2016 | Yi et al. | |
| 9,533,856 | B2 | 1/2017 | Spelich et al. | |
| 9,670,656 | B2 | 6/2017 | Rutkowski et al. | |
| 9,723,962 | B2 | 8/2017 | Yoon et al. | |
| 9,733,549 | B2 | 8/2017 | Drost et al. | |
| 10,479,385 | B2 | 11/2019 | Collibault et al. | |
| 2001/0038786 | A1 | 11/2001 | Kim | |
| 2003/0182754 | A1 | 10/2003 | O'Brian | |
| 2003/0231927 | A1 | 12/2003 | Hale | |
| 2004/0204792 | A1 | 10/2004 | Taylor et al. | |
| 2004/0255415 | A1 | 12/2004 | Silva | |
| 2005/0028307 | A1 | 2/2005 | Wu | |
| 2005/0166355 | A1 | 8/2005 | Tani | |
| 2005/0183229 | A1 | 8/2005 | Uehigashi | |
| 2006/0130646 | A1 | 6/2006 | Sep et al. | |
| 2006/0193129 | A1 | 8/2006 | Opolka | |
| 2007/0033752 | A1 | 2/2007 | Hung | |
| 2008/0098544 | A1 * | 5/2008 | Rutkowski | E03F 9/005 15/104.33 |
| 2008/0148503 | A1 | 6/2008 | Babb et al. | |
| 2008/0229527 | A1 | 9/2008 | Berry | |
| 2008/0244816 | A1 | 10/2008 | Babb et al. | |
| 2009/0083915 | A1 * | 4/2009 | Cicchelli | B08B 9/045 15/3 |
| 2009/0208282 | A1 | 8/2009 | Hale | |
| 2009/0211044 | A1 * | 8/2009 | Hale | B08B 9/045 15/104.33 |
| 2009/0300863 | A1 | 12/2009 | Bartucciotto | |
| 2010/0017981 | A1 * | 1/2010 | Hamm | B08B 9/0436 15/104.33 |
| 2010/0050350 | A1 * | 3/2010 | Babb | F16H 7/1281 15/104.33 |
| 2010/0053942 | A1 | 3/2010 | Tarter et al. | |

(56) References Cited

U.S. PATENT DOCUMENTS

| | | | |
|---|---|---|---|
| 2010/0132143 | A1 | 6/2010 | Flamand |
| 2010/0139696 | A1 * | 6/2010 | Silverman ............... B08B 9/045 15/104.33 |
| 2010/0218325 | A1 * | 9/2010 | Hale ......................... B08B 9/04 15/104.33 |
| 2010/0293742 | A1 | 11/2010 | Chung et al. |
| 2011/0035883 | A1 | 2/2011 | Vogel et al. |
| 2011/0182656 | A1 | 7/2011 | Babb |
| 2011/0242799 | A1 | 10/2011 | Dyer |
| 2012/0110761 | A1 | 5/2012 | Ripperger et al. |
| 2012/0140457 | A1 | 6/2012 | McQuade |
| 2012/0300057 | A1 | 11/2012 | Bartucciotto |
| 2013/0192907 | A1 | 8/2013 | Sarokham et al. |
| 2014/0115802 | A1 | 5/2014 | Yu |
| 2014/0247338 | A1 | 9/2014 | Kessler |
| 2014/0268682 | A1 | 9/2014 | Brady |
| 2014/0271095 | A1 | 9/2014 | Umans et al. |
| 2014/0289991 | A1 | 10/2014 | Landy et al. |
| 2015/0104241 | A1 | 4/2015 | Spelich et al. |
| 2015/0176637 | A1 | 6/2015 | Dunkin et al. |
| 2015/0185322 | A1 | 7/2015 | Haegermarck |
| 2015/0250299 | A1 | 9/2015 | Danzeisen |
| 2015/0329380 | A1 | 11/2015 | Zhu et al. |
| 2016/0175899 | A1 | 6/2016 | Dunkin et al. |
| 2016/0219205 | A1 | 7/2016 | Kessler |
| 2017/0191646 | A1 | 7/2017 | Marie et al. |
| 2017/0268315 | A1 | 9/2017 | Reyes et al. |
| 2018/0119406 | A1 * | 5/2018 | Scott ......................... B08B 9/04 |
| 2019/0210078 | A1 | 7/2019 | Davies et al. |
| 2019/0315385 | A1 | 10/2019 | Wolf et al. |
| 2022/0184672 | A1 | 6/2022 | Spaulding et al. |

FOREIGN PATENT DOCUMENTS

| | | | |
|---|---|---|---|
| CN | 201844212 | U | 5/2011 |
| CN | 202516816 | U | 11/2012 |
| CN | 202577502 | U | 12/2012 |
| CN | 206247092 | U | 6/2017 |
| CN | 206310294 | U | 7/2017 |
| DE | 1942086 | U | 7/1966 |
| DE | 2244206 | A1 | 3/1974 |
| DE | 3423464 | A1 | 1/1986 |
| DE | 20111229 | A1 | 10/2001 |
| DE | 10248411 | A1 | 4/2004 |
| DE | 102012109648 | A1 | 4/2014 |
| EP | 1375763 | A1 | 1/2004 |
| EP | 1930649 | A1 | 6/2008 |
| EP | 2502681 | A2 | 9/2012 |
| GB | 1118126 | A | 6/1968 |
| GB | 1217090 | A | 12/1970 |
| GB | 2142944 | A | 1/1985 |
| KR | 20150055804 | A | 5/2015 |
| WO | WO2001077575 | A1 | 10/2001 |
| WO | WO2006080918 | A1 | 8/2006 |
| WO | WO2006112847 | A1 | 10/2006 |
| WO | WO2006112848 | A1 | 10/2006 |
| WO | WO2010053374 | A1 | 5/2010 |
| WO | WO2011036691 | A1 | 3/2011 |

OTHER PUBLICATIONS

Global Industrial, "Wesco Stairking Battery Powered Stair Climbing Appliance Hand Truck 230051 66"H", <https://www.globalindustrial.com/p/material-handling/hand-trucks-dollies/hand- trucks-appliance-stair-climbing/battery-powered-stair-climbing-appliance-hand-truck-66-h-850-lb-capacity>, webpage publicly available at least as early as Nov. 11, 2017.

Handtrucks2go, "Escalera Staircat Powered Stair Climber Hand Truck", <https://handtrucks2go.com/Escalera-Electric-Stair-Climber.html>, webpage accessed Apr. 13, 2018.

Global Industrial, "Industrial Strength Steel Hand Truck with Curved Handle & Stair Climbers 600 Lb. Capacity", <https://www.globalindustrial.com/p/material-handling/hand-trucks-dollies/hand-trucks-steel/industrial-strength-steel-hand-truck-curved-handle-with-stair-climbers>, web page accessed Apr. 13, 2018.

International Search Report and Written Opinion for Application No. PCT/US2020/036914 dated Sep. 21, 2020 (19 pages).

* cited by examiner

SEWER CLEANING MACHINE

CROSS REFERENCE TO RELATED APPLICATIONS

This application is a divisional of U.S. patent application Ser. No. 16/889,999, filed on Jun. 2, 2020, now U.S. Pat. No. 11,603,653, which is a divisional of U.S. patent application Ser. No. 15/795,907, filed on Oct. 27, 2017, now U.S. Pat. No. 10,704,250, which claims priority to U.S. Provisional Patent Application No. 62/442,502, filed on Jan. 5, 2017, and to U.S. Provisional Patent Application No. 62/414,312, filed on Oct. 28, 2016, the entire contents of all of which are incorporated by reference herein.

BACKGROUND OF THE INVENTION

The present invention relates to sewer cleaning machines for cleaning drains, pipes, or other conduits.

Sewer cleaning machines are used to clean clogs and debris out of drains, sewers, and the like. Smaller handheld drain cleaners may be used to clean household drains from sinks or shower drains. However, larger and heavier cleaning machines are often used to clean sewers and industrial drains. A sewer cleaning machine may have as much as 200-300 feet of cable and a weight of 200-300 lbs. Accordingly, some sewer cleaning machines may be cumbersome to transport.

SUMMARY

In one embodiment, the invention provides a sewer cleaning machine including a frame and a drum rotatably supported by the frame. The drum includes a cable that is selectively extendable out of the drum. The sewer cleaning machine also includes a motor supported by the frame and coupled to the drum. The motor is operable to rotate the drum. The drum is configured to engage a surface to facilitate moving the sewer cleaning machine along the surface.

In another embodiment, the invention provides a sewer cleaning machine including a power base with a motor and a drive mechanism, and a drum removably coupled to the power base. The drum includes a cable that is selectively extendable out of the drum and is movable between a first position, in which the drum is supported by the power base and coupled to the drive mechanism, and a second position, in which the drum is separated from the power base.

In another embodiment, the invention provides a sewer cleaning machine including a frame and a drum supported by the frame. The drum includes a cable that is selectively extendable out of the drum. The sewer cleaning machine further includes a motor supported by the frame and coupled to the drum. The motor is operable to rotate the drum. The frame is moveable between a first position, in which the drum is supported by the frame off of a surface, and a second position, in which the drum contacts the surface.

In another embodiment, the invention provides a sewer cleaning machine including a frame and a drum supported by the frame. The drum includes a cable that is selectively extendable out of the drum. The sewer cleaning machine also includes a first motor supported by the frame and coupled to the drum. The first motor is operable to rotate the drum. The sewer cleaning machine further includes a track supported by the frame and a second motor supported by the frame and coupled to the track. The second motor is operable to move the track.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
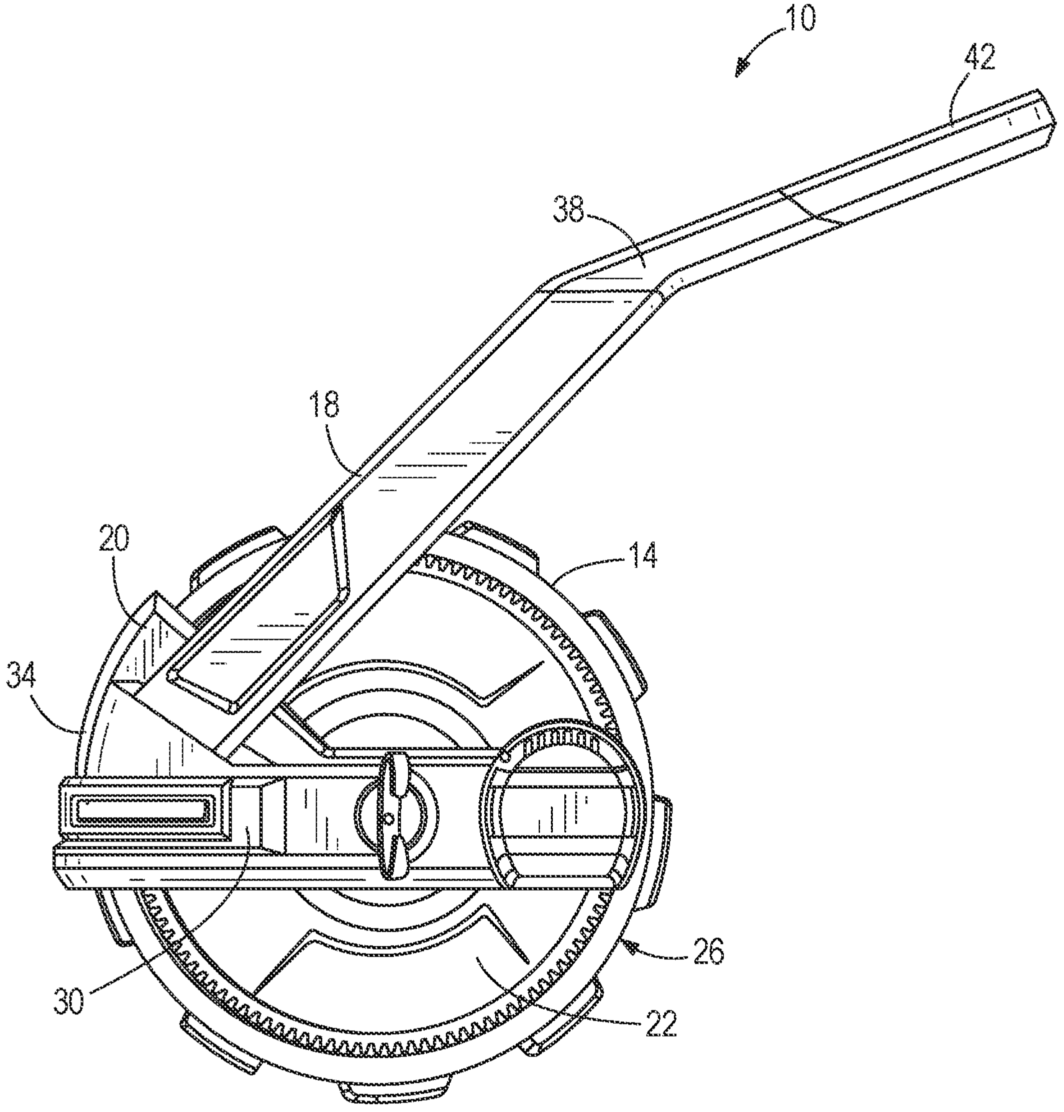
FIG. 1 is a side view of a sewer cleaning machine including a rotatable drum acting as a wheel.

FIG. 1 illustrates a sewer cleaning machine 10 including a rotatable drum 14, a frame 18, a motor, and a battery. The drum 14 is generally wheel shaped, with two circular side walls 22 that are spaced apart from one another. The side walls 22 are connected by a perimeter wall 26. The drum 14 houses a cable or spring for cleaning drains, pipes, or other conduits. The drum 14 is rotatably mounted to the frame 18 and defines an axis of rotation extending through the center of the side walls 22. The frame 18 includes a main body 20 and a handle 38. The main body 20 has first and second arms 30 that extend along the side walls 22 of the drum 14. Specifically, the first and second arms 30 are connected to the drum 14 near the axis of rotation and extend radially outward along a portion of the diameter of the drum 14. The first and second arms 30 are connected to one another by a bridge member 34 that wraps around a portion of the perimeter wall 26 of the drum 14.

The handle 38 extends outwardly from the main body 20 of the frame 18. In the illustrated embodiment, the handle 38 extends from the main body 20 at a location near the perimeter of the drum 14. However, in other embodiments, the handle 38 may extend from the main body 20 at a location near the axis of rotation of the drum 14. The handle 38 includes a grip 42 that can be grasped by a user to steer the sewer cleaning machine 10. In some embodiments, the grip 42 may include powered controls to assist with steering, speed, or braking the sewer cleaning machine 10 when, for example, going up or down stairs. In some embodiments, the handle 38 is rotatable relative to the main body 20 of the frame 18. For example, the handle 38 can be rotated between a transport mode and an operational mode. Rotation of the handle 38 also enables the handle 38 to accommodate users of different heights.

The motor is powered by the battery to rotate the drum 14. When in transport mode (as shown in FIG. 1), the drum 14 contacts the ground to move the sewer cleaning machine 10 along the ground. In one embodiment, rotation of the drum 14 in the transport mode is powered by the motor, which drives movement of the sewer cleaning machine 10. In another embodiment, a second motor separate from the motor may be used to drive rotation of the drum 14 in the transport mode. In some embodiments, treads extend from or are formed on the perimeter wall 26 of the drum 14.

Figure 2:
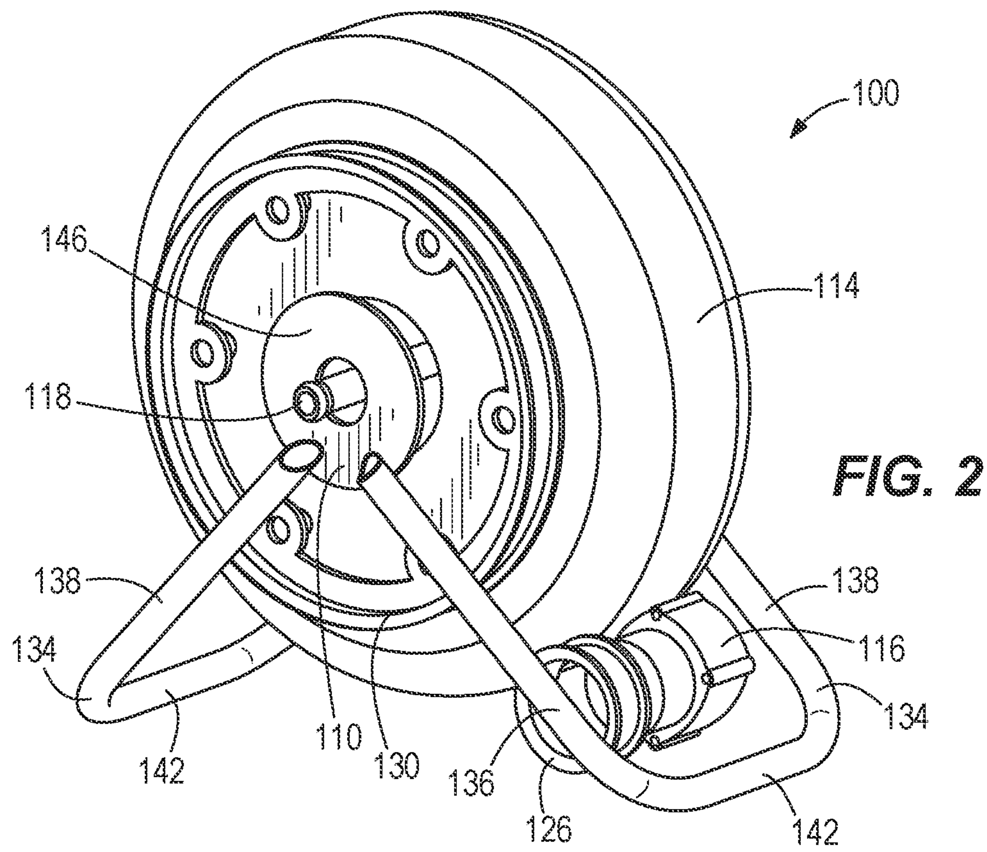
FIG. 2 is a perspective view of another sewer cleaning machine in an operational mode.
Figure 3:
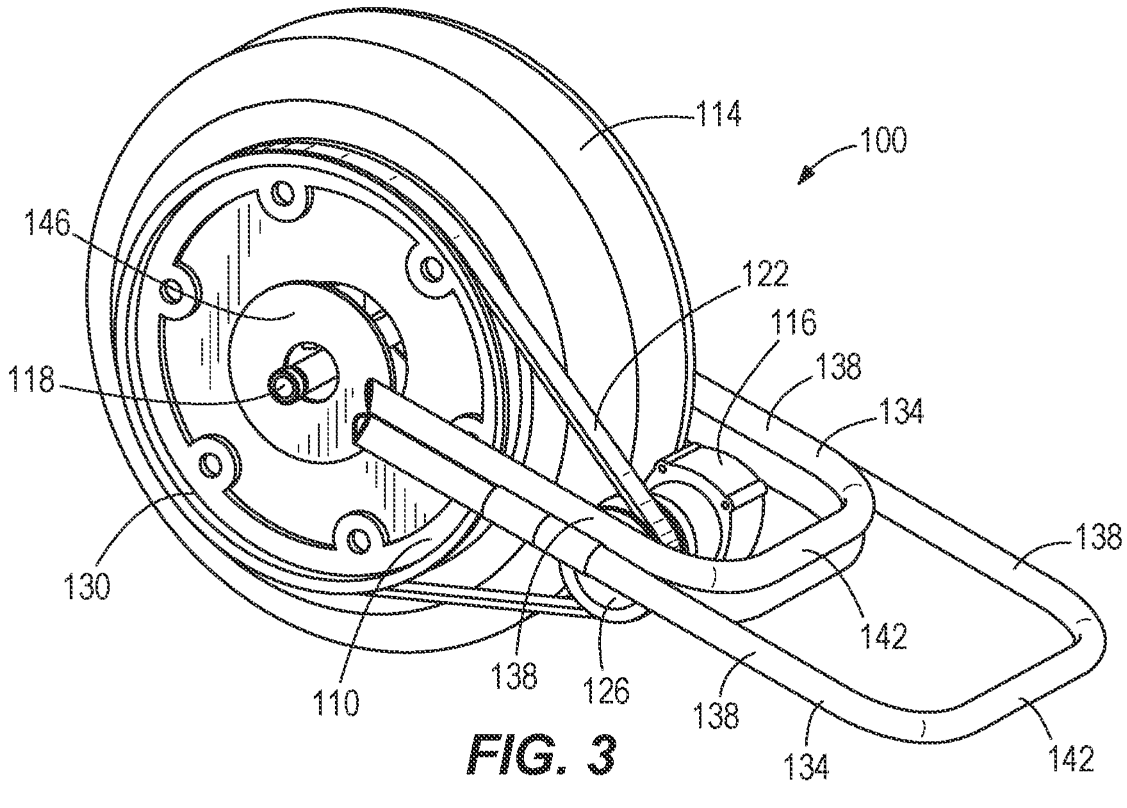
FIG. 3 is a perspective view of the sewer cleaning machine of FIG. 2 in a transport mode.

FIGS. 2 and 3 illustrate another sewer cleaning machine 100. The illustrated machine 100 includes a frame 110, a rotatable drum 114 supported by the frame 110, and a motor 116 supported by the frame 110. The drum 114 houses a cable or spring for cleaning drains, pipes, or other conduits. The drum 114 is rotatably supported by the frame 110. Specifically, the frame 110 includes a shaft 118 that extends through the center of the drum 114 and defines an axis of rotation of the drum 114. The motor 116 rotates the drum 114 through, for example, a belt drive 122 (FIG. 3). In some embodiments, the belt drive 122 extends between a drive hub 126 of the motor 116 and a driven hub 130 on the frame 110. In the illustrated embodiment, the driven hub 130 is disposed adjacent the drum 114. The driven hub 130 is coupled to a side of the drum 114 and is fixed relative to the drum 114 such that rotation of the driven hub 130 causes rotation of the drum 114.

The frame 110 further includes first and second handles 134 extending radially outward from the center of the drum 114 and beyond a perimeter of the drum 114. In the illustrated embodiment, the handles 134 are U-shaped with two side members 138 and a central member 142 connecting the two side members 138. The side members 138 of the first and second handles 134 are coupled to a spool 146 extending from the shaft 118. In other embodiments, the handles 134 can be coupled directly to the shaft 118. The illustrated first and second handles 134 include side members 138 that are extendable to different lengths, for example, through telescoping bodies. The first and second handles 134 are rotatable relative to the drum 114. Specifically, the first and second handles 134 are also rotatable about the axis of rotation of the drum 114. In addition, the first and second handles 134 are rotatable relative to one another and can be positioned at different angles relative to one another.

The frame 110 is articulatable between an operational mode (FIG. 2) and a transport mode (FIG. 3). Referring to FIG. 2, in the operational mode, the frame 110 functions as a stand to support the drum 114 off of the ground. In the illustrated embodiment, the first and second handles 134 are rotated to different positions relative to one another to form the stand. More specifically, the first and second handles 134 are rotated to different radial positions relative to one another to form legs of the stand. The drum 114 is supported by the first and second handles 134 and is positioned between the first and second handles 134. In the operational mode, both the first and second handles 134 contact the ground to create a steady support for the drum 114 while the drum 114 is in use. Specifically, the central members 142 of the handles 134 engage the ground to support the drum 114 above the ground so that the drum 114 may rotate without interference.

Referring to FIG. 3, in the transport mode, the frame 110 functions as a handle that can be grasped by a user to steer the drum 114 along the ground. Specifically, the first and second handles 134 are rotated to the same position as one another so that there is minimal separation between the first and second handles 134, enabling a user to grasp both the first and the second handles 134 at the same time. In addition, the first and second handles 134 are oriented to a position that enables a user to use the first and second handles 134 as a single handle. As previously mentioned, in some embodiments, the first and second handles 134 can be extended to different lengths to accommodate users of different heights. When in the transport mode, the drum 114 engages the ground and can be rolled along the ground to different locations for easy transport of the sewer cleaning machine 100. The first and second handles 134 can also be used to push or pull the drum 114 along the ground.

Figure 4:
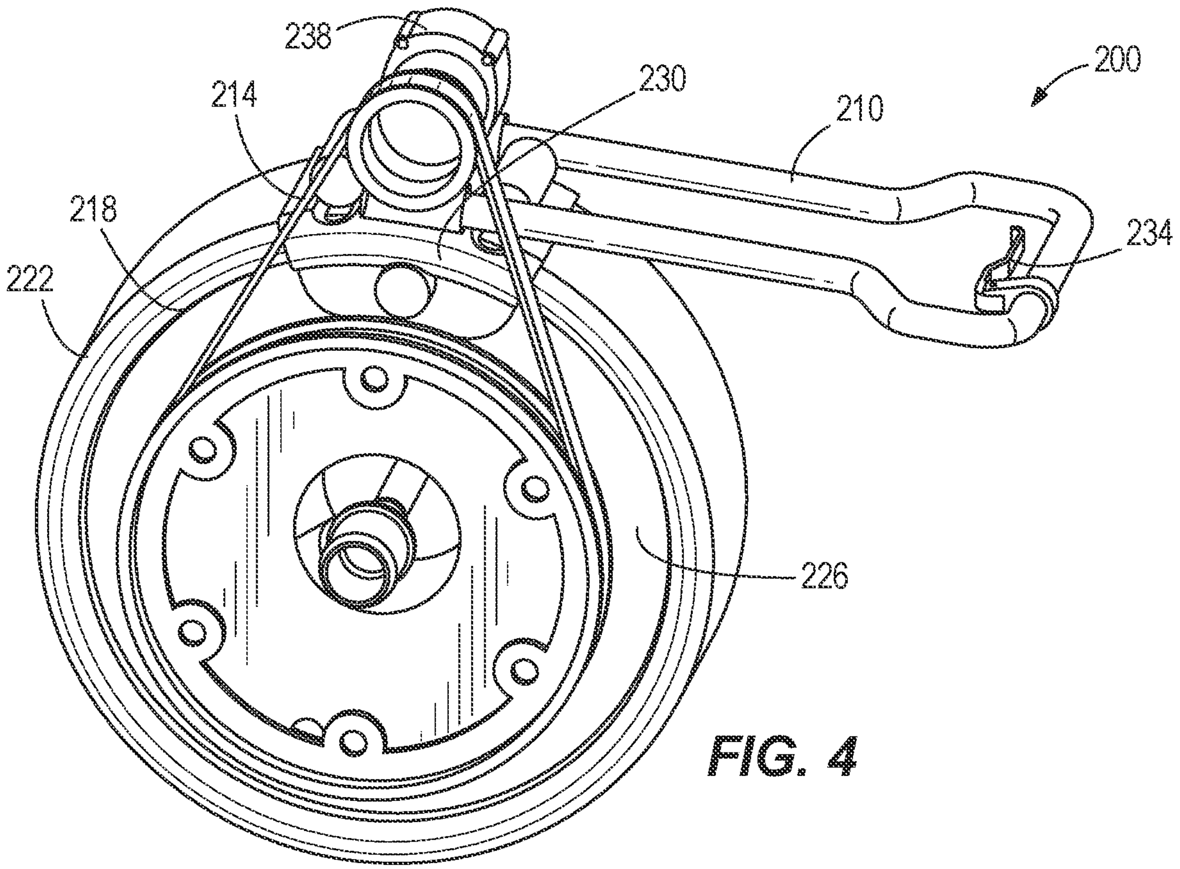
FIG. 4 is a perspective view of another sewer cleaning machine in a transport mode.

FIG. 4 illustrates a sewer cleaning machine 200 that is similar to the sewer cleaning machine 100 shown in FIGS. 2-3, but with an alternative frame 214. In this embodiment, the sewer cleaning machine 200 has a single handle 210. In addition, the frame 214 is coupled to a track 218 formed adjacent a perimeter 222 of a rotatable drum 226, rather than to a spool positioned at the axis of rotation of the drum 226. Specifically, rather than extending radially outward from the center of the drum 226, the handle 210 extends tangentially from the perimeter 222 of the drum 226. The track 218 is formed by a ridge onto which a portion of the frame 214 can be connected. In particular, the frame 214 includes a slide member 230 that is latched onto the track 218 and can slide along the track 218 about the perimeter 222 of the drum 226. Accordingly, the drum 226 is movable relative to the slide member 230 and the handle 210. This enables the drum 226 to roll along the ground and rotate relative to the slide member 230 without affecting the position of the handle 210. A user can grasp the handle 210 to control movement of the sewer cleaning machine 200. In some embodiments, a lever 234 is disposed on the handle 210 to actuate a motor 238 to rotate the drum 226 for transportation of the sewer cleaning machine 200.

Figure 5:
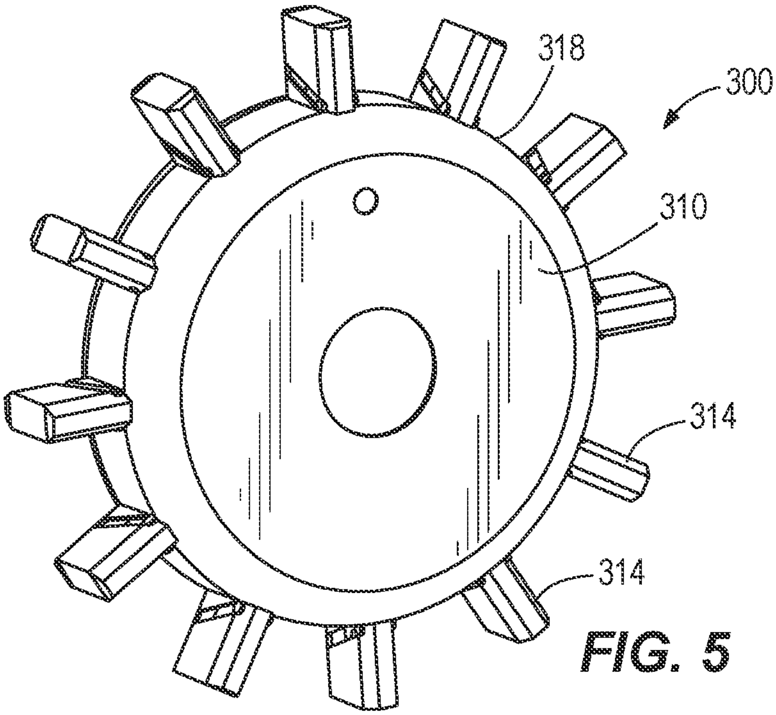
FIG. 5 is a perspective view of a rotatable drum having extensible treads.

FIG. 5 illustrates another sewer cleaning machine 300. The sewer cleaning machine 200 includes a rotatable drum 310 with extensible treads 314. The treads 314 can selectively extend from a perimeter 318 of the drum 310 to provide extra traction. In some embodiments, the treads 314 can be mechanically extended from the drum 310 by, for example, a lever and cam mechanisms. In other embodiments, the treads 314 can be electrically extended from the drum 310 by, for example, a switch and solenoids. When in an operational mode, the treads 314 can be retracted into the drum 310 so that the treads 314 do not interfere with rotation of the drum 318. The rotatable drum 310 shown in FIG. 5 can be used with the other embodiments of a sewer cleaning machine shown herein. For example, in some embodiments, the drum 310 of FIG. 5 can include a handle as shown in FIGS. 2-4.

Figure 6:
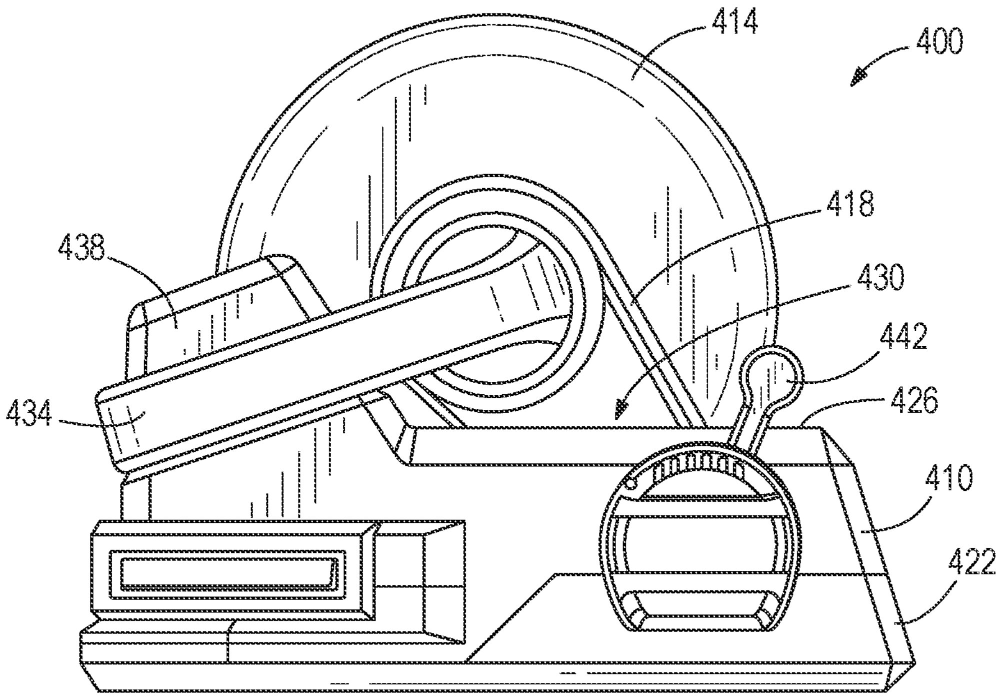
FIG. 6 is a side view of a sewer cleaning machine including a rotatable drum and a power base.

FIG. 6 illustrates a sewer cleaning machine 400 including a power base 410 and a rotatable drum 414. The rotatable drum 414 is supported by the power base 410 when in an operational mode (as shown in FIG. 6). The power base 410, or stand or pod, includes a battery and a motor. The battery powers the motor to rotate the drum 414 through, for example, a belt drive 418. In other embodiments, the motor may rotate the drum 414 through other drive means.

The power base 410 includes a generally flat bottom portion 422 that creates a surface area for contacting the ground. The bottom portion 422 provides stability to the power base 410 and the drum 414 when in operation. In some embodiments, the bottom portion 422 is constructed with materials that provide traction to inhibit movement of the power base 410 when the sewer cleaning machine 400 is in use. Similarly, the bottom portion 422 may be constructed with materials, such as rubber, that help reduce vibration. An upper portion 426 of the power base 410 includes a cavity 430 for receiving a portion of the drum 414. To begin operation of the sewer cleaning machine 400, the drum 414 is positioned within the receiving cavity 430 and secured to the power base 410. The receiving cavity 430 enables the drum 414 to be secured within the power base 410, while still being capable of rotation.

Once the drum 414 is inserted into the power base 410, a handle 434 extending from the rotatable drum 414 can also collapse or fold onto the power base 410. The handle 434 may be clamped to the power base 410 to secure the drum 414 on the power base 410. In the illustrated embodiment, the handle 434 wraps around a back end 438 of the power base 410. In some embodiments, the handle 434 may be snap-fitted over a portion of the power base 410 to restrict movement of the drum 414 relative to the power base 410. Furthermore, in some embodiments, the power base 410 may include an actuator 442 to lock/unlock the drum 414 from the power base 410.

To operate the drum 414 (i.e., drive rotation of the drum 414), the power base 410 may include other controls to control the operation of the drum 414. For example, the power base 410 may include controls to activate the motor and drive rotation of the drum 414. In addition, the sewer cleaning machine 400 may have additional features that may be operated by controls disposed on the power base 410. For example, in some embodiments, the power base 410 includes a cleaning cycle. During the cleaning cycle, the power base 410 functions similar to a dishwasher to clean the cable. In this embodiment, the power base 410 may include cleaning solution that is sprayed onto the cable as it retracts into the drum 414. Alternatively, or in addition, the cavity 430 of the power base 410 may be filled with cleaning solution to submerge or soak the cable.

When operation of the sewer cleaning machine 400 is complete, the rotatable drum 414 is also removable from the power base 410 to facilitate transporting the drum 414. When separated from the power base 410, the drum 414 can contact the ground to roll along the ground. The handle 434 can be grasped by a user to steer the drum 414 along the ground.

Figure 7:
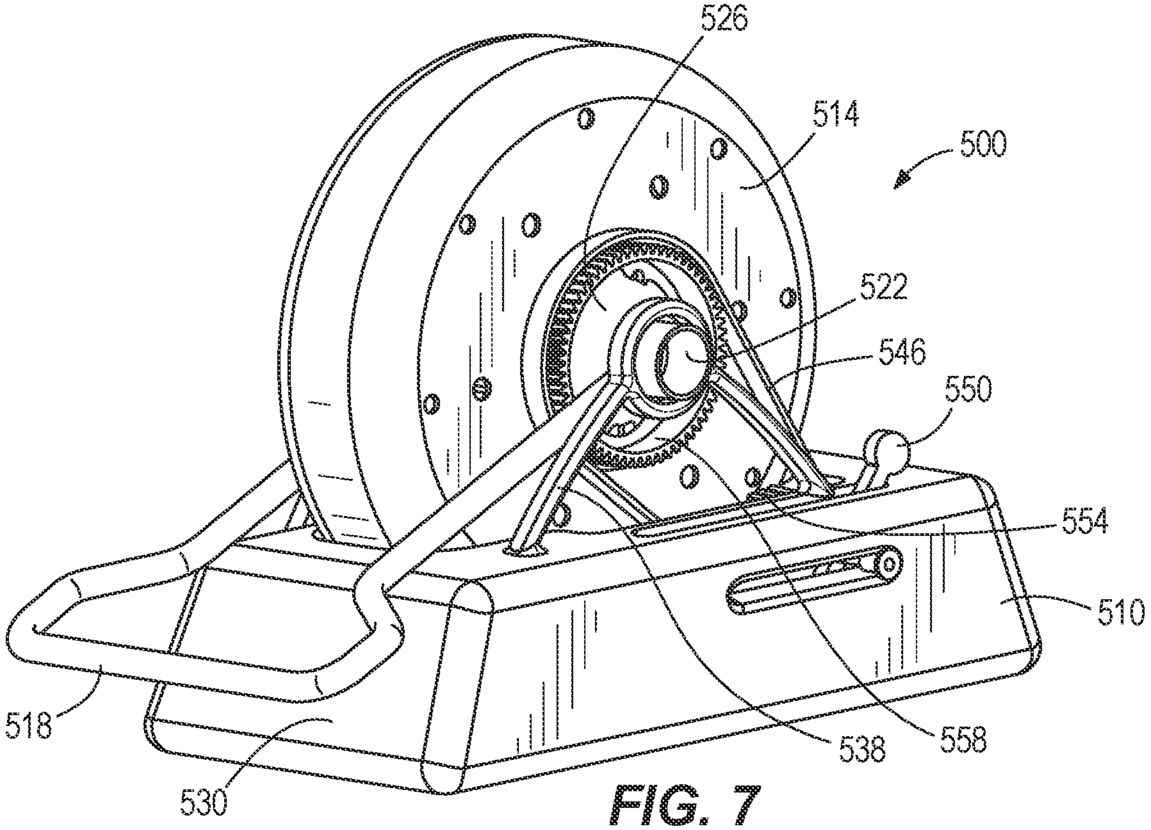
FIG. 7 is a perspective view of another sewer cleaning machine including a rotatable drum and a power base in an operational mode.
Figure 8:
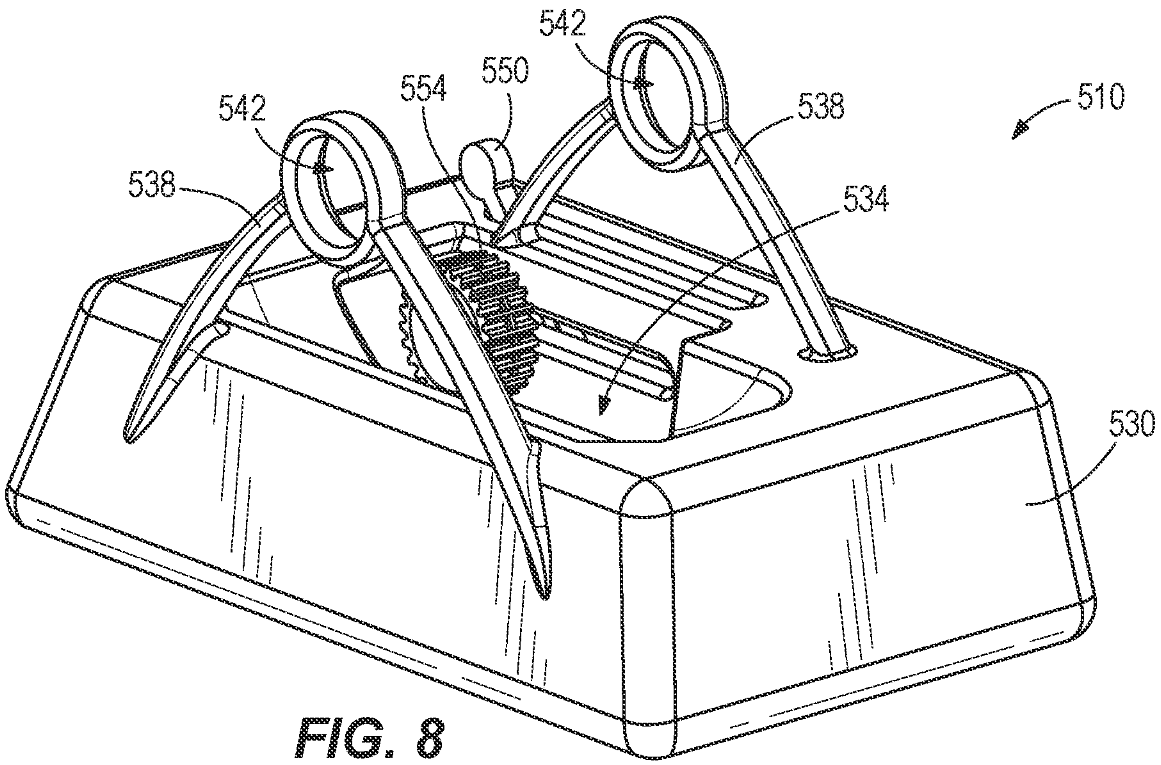
FIG. 8 is a perspective view of the power base shown in FIG. 7.
Figure 9:
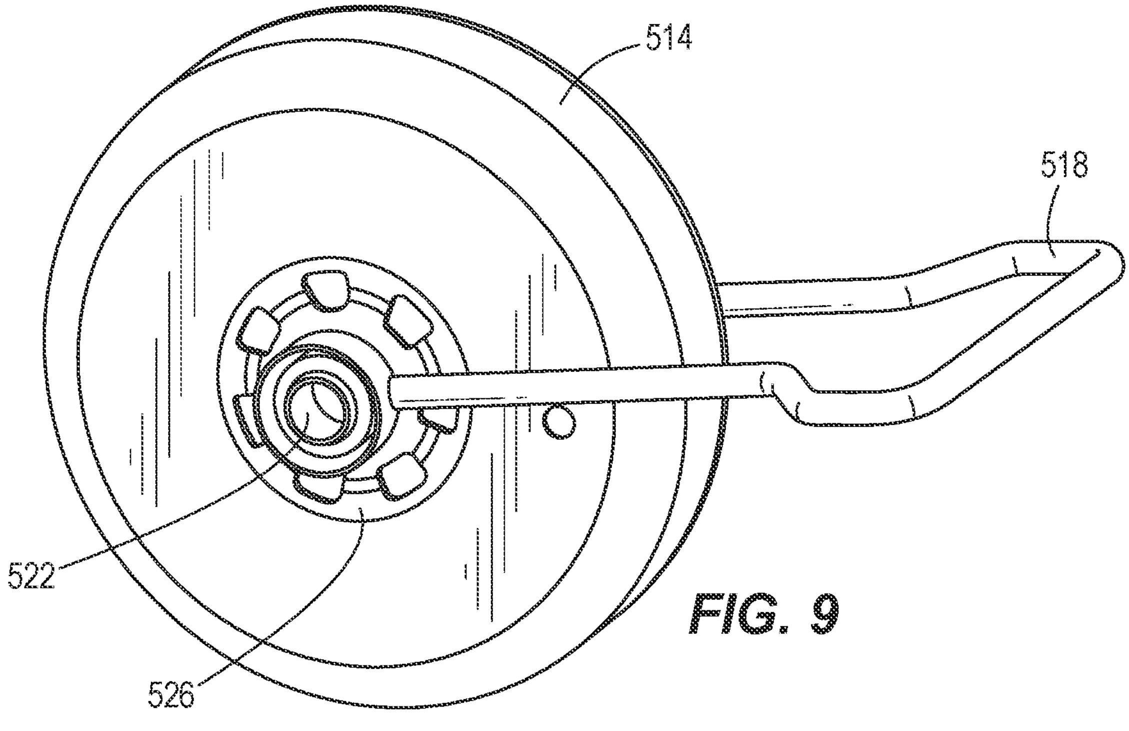
FIG. 9 is a perspective view of the rotatable drum shown in FIG. 7 in a transport mode.

FIGS. 7-9 illustrate another sewer cleaning machine 500 including a power base 510 (FIG. 8) and a rotatable drum 514 (FIG. 9). The rotatable drum 514 includes a handle 518 to facilitate moving the drum 514 along the ground when the drum 514 is disconnected from the power base 510. The handle 518 is connected to a shaft 522 extending through the center of the drum 514. The shaft 522 defines an axis of rotation of the drum 514. The handle 518 is connected to the shaft 522 by a spool 526 that engages with the shaft 522 on each side of the drum 514. In some embodiments, the handle 518 is rotatably connected to the shaft 522 such that the drum 514 and the shaft 522 rotate relative to the handle 518 when the drum 514 is rolled along the ground. In other embodiments, the handle 518 is fixed relative to the shaft 522, and drum 514 rotates about the shaft 522 relative to the handle 518 and the shaft 522.

The power base 510 includes a generally flat bottom portion 530 for providing a stable support for the sewer cleaning machine 500. The power base 510 also includes a cavity 534 for receiving the drum 514 during an operational mode of the sewer cleaning machine 500. The power base 510 includes two brackets 538 extending upward from the bottom portion 530 of the power base 510. Each bracket 538 defines an aperture 542 for receiving an end of the shaft 522 of the drum 514 when the drum 514 is inserted into the power base 510. The brackets 538 rotationally support the drum 514 within the power base 510 to secure the drum 514 to the power base 510 while enabling rotation of the drum 514.

The power base 510 includes a drive mechanism (e.g., a belt drive 546 and motor) for rotating the drum 514, and an actuator 550 for selectively securing the drum 514 to the power base 510. In the illustrated embodiment, the belt drive 546 is wrapped around a drive gear 554 positioned inside the cavity 534 of the power base 510 and around a driven gear 558 positioned on the side of the drum 514. Specifically, the driven gear 558 extends circumferentially around the shaft 522 of the drum 514. Rotation of the drive gear 554 drives rotation of the driven gear 558, which in turn, drives rotation of the drum 514. The drive gear 554 is driven by a motor disposed within the power base 510. Similar to the power base 410 shown in FIG. 6, the power base 510 of FIG. 8 can include additional actuators and controls to lock the drum 514 in the power base 510 or to control the operation of the drum 514.

Figure 10:
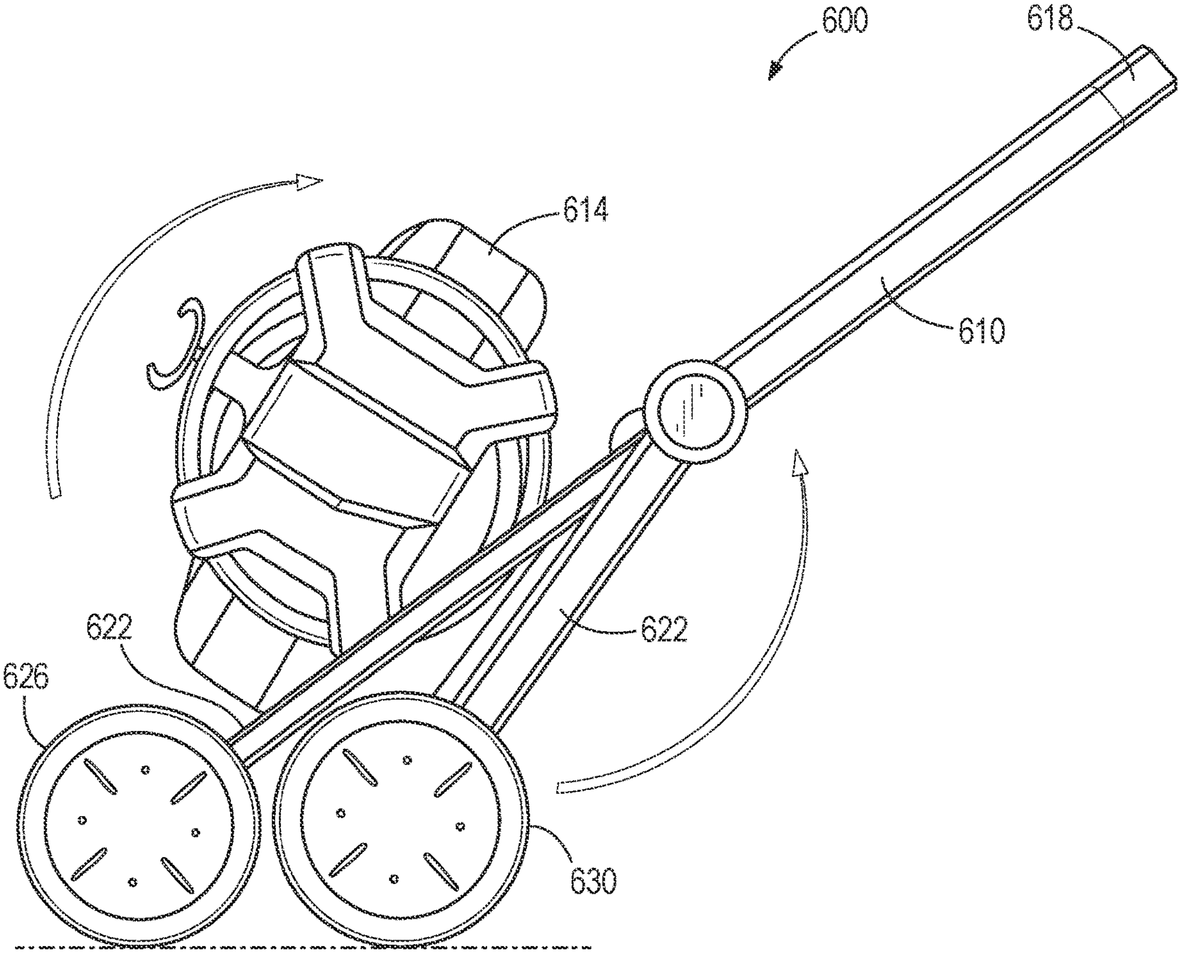
FIG. 10 is a perspective view of a sewer cleaning machine including a rotatable drum supported on a cart.

FIG. 10 illustrates a sewer cleaning machine 600 including a frame 610 and a drum 614 supported by the frame 610. The illustrated frame 610, or cart, includes a handle 618, legs 622 extending from the handle 618, and wheels coupled to the legs 622. The frame 610 is articulatable (e.g., foldable) to different positions to facilitate operating and transporting the machine 600. For example, in the illustrated embodiment, a front set of wheels 626 is rigidly connected to the handle 618, while a rear set of wheels 630 is rotatable relative to the handle 618. This enables the rear wheels 630 to be rotated or flipped up under the handle 618 for loading or unloading the sewer cleaning machine 600 into or from a vehicle. In addition, the drum 614 can rotate relative to the frame 610.

Figure 11:
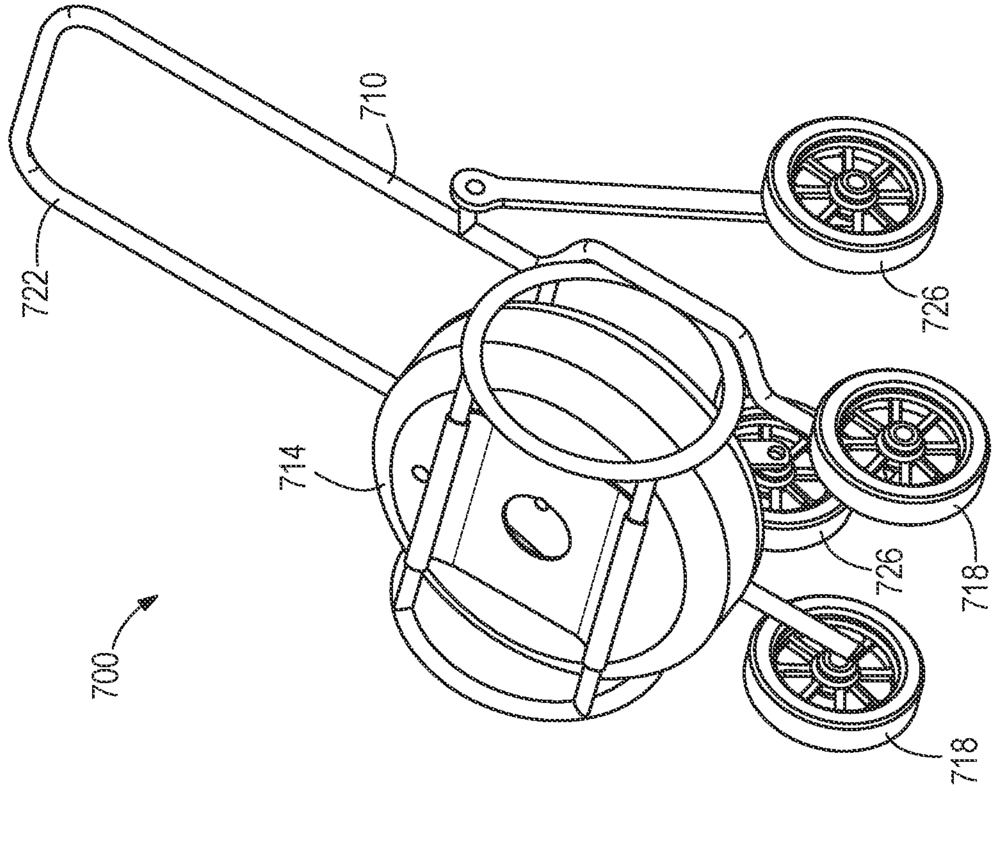
FIG. 11 is a perspective view of another sewer cleaning machine including a rotatable drum supported on a cart.

FIG. 11 illustrates another sewer cleaning machine 700 including a frame 710 or cart and a drum 714. Similar to the frame 610 in FIG. 10, the frame 710 includes a front set of wheels 718 that is rigidly connected to a handle 722, and a rear set of wheels 726 is rotatable relative to the handle 722.

Figure 12:
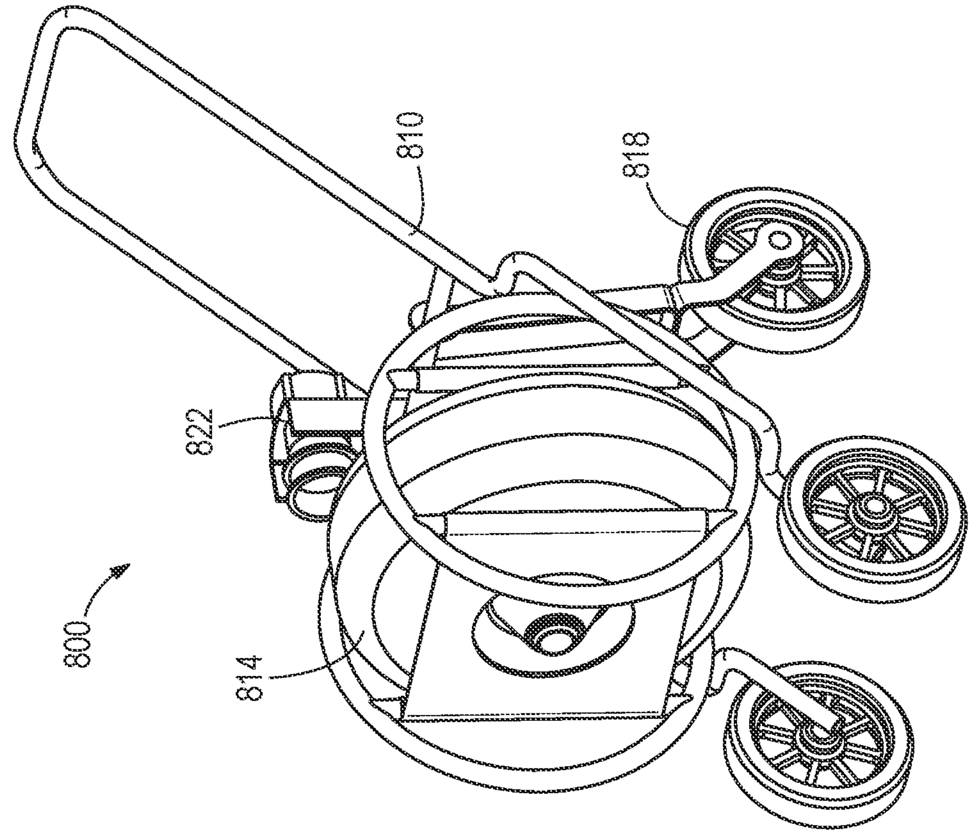
FIG. 12 is a perspective view of yet another sewer cleaning machine including a rotatable drum supported on a cart.

FIG. 12 illustrates yet another sewer cleaning machine 800 including a frame 810 or cart and a drum 814, where at least rear wheels 818 of the frame 810 are caster wheels. In some embodiments, the wheels 818 can be composed of shock absorbing material, such as rubber. In this embodiment, the frame 810 further includes a belt drive 822 to rotate the drum 814 while the drum 814 is supported on the frame 810.

Figure 13:
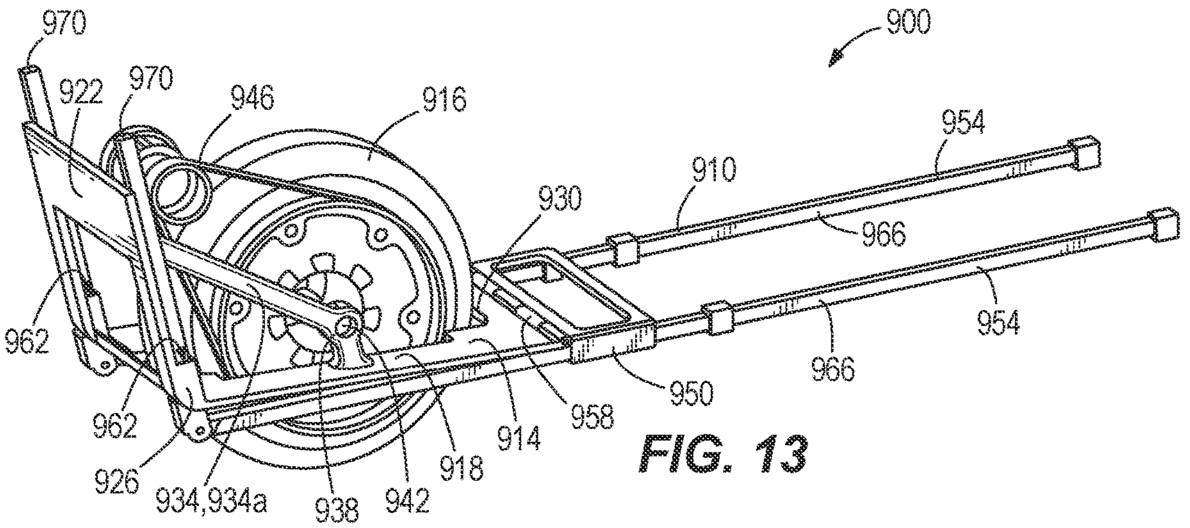
FIG. 13 is a perspective view of a sewer cleaning machine including a rotatable drum and a cart in a transport mode.
Figure 14:
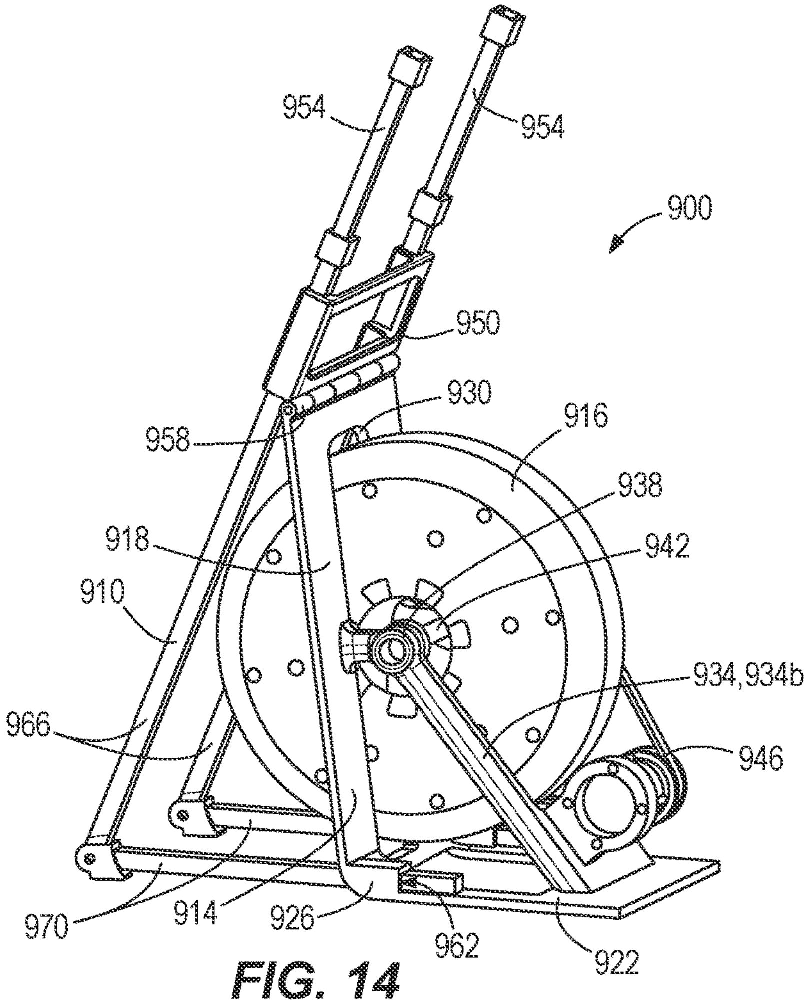
FIG. 14 is a perspective view of the sewer cleaning machine of FIG. 13 in an operational mode.

FIGS. 13 and 14 illustrate another sewer cleaning machine 900 including a frame 910 and a drum 916 supported by the frame 910. The frame 910, or cart, is articulatable into a transport mode (FIG. 13) and an operational mode (FIG. 14). The frame 910 includes a main body 914 that rotatably supports the drum 916. The main body 914 includes a first portion 918 and a second portion 922 that are connected at a corner 926 to form an L. The first portion 918 of the main body 914 is plate-like and includes a large slot 930 for receiving the drum 916. Specifically, the drum 916 extends at least partially through the slot 930. The main body 914 includes first and second rod members 934 that extend between the first portion 918 and the second portion 922 to rotatably support the drum 916 on the main body 914. The first rod member **934*a* is positioned on a first side of the drum 916, and the second rod member 934*b* is positioned on a second side of the drum 916. The first and second rod members 934 include orifices 938 for receiving a shaft 942 extending through the drum 916. The shaft 942 defines an axis of rotation of the drum 916. The main body 914 also supports a drive unit (e.g., a belt drive 946) for driving rotation of the drum 916**.

The main body 914 further includes a slide member 950 for slidably receiving handles 954 of the sewer cleaning machine 900. The slide member 950 is rotatably connected to the first portion 918. Specifically, the slide member 950 is connected to the first portion 918 by a hinge 958 formed on an end of the first portion 918. The hinge 958 is formed on the end of the first portion 918 that is opposite the corner 926 where the first portion 918 connects to the second portion 922. In addition, the corner 926 of the main body 914 includes channels 962 that slidably receive the handles 954.

The handles 954 of the sewer cleaning machine 900 are elongated and each includes a first leg 966 and a second leg 970. The first leg 966 and the second leg 970 are rotatably connected, for example, by a hinge 958. The first leg 966 of each handle 954 is slidably received by the slide member 950. The second leg 970 of each handle 954 is slidably received by the channels 962 disposed within the corner 926 of the main body 914. Movement of the handles 954 relative to the main body 914 enables the frame 910 to articulate between a transport mode (FIG. 13) and an operational mode (FIG. 14).

When in the transport mode, the handles 954 are moved relative to the main body 914 such that the hinge 958 connecting the first legs 966 and the second legs 970 is moved towards the corner 926 of the main body 914. In this position, the first legs 966 of the handles 954 align with the first portion 918 of the main body 914, and the second legs 970 of the handles 954 align with the second portion 922 of the main body 914. In addition, the drum 916 can contact the ground to act like a wheelbarrow. In some embodiments, the first legs 966 of the handles 954 may be collapsible (e.g., telescoping handles 954).

When in the operational mode, the frame 910 supports the drum 916 off of the ground to enable rotation of the drum 916 without interference. To adjust from the transport mode to the operational mode, the handles 954 of the sewer cleaning machine 900 are moved relative to the main body 914 so that the hinge 958 connecting the first legs 966 and the second legs 970 is moved away from the corner 926 of the main body 914. Specifically, the first legs 966 of the handles 954 slide within the slide member 950, and the second legs 970 of the handles 954 slide within the channels 962. In the operational position, the handles 954 and the main body 914 form a tripod-type configuration to support the drum 916 off the ground. In particular, the first legs 966 of the handles 954 and the first portion 918 of the main body 914 form upright members of the tripod. The second legs 970 of the handles 954 and the second portion 922 of the main body 914 form a platform for engaging the ground. As shown, when adjusting the handles 954 relative to the legs, the handles 954 slide within the slide member 950 and the channels 962.

Figure 15:
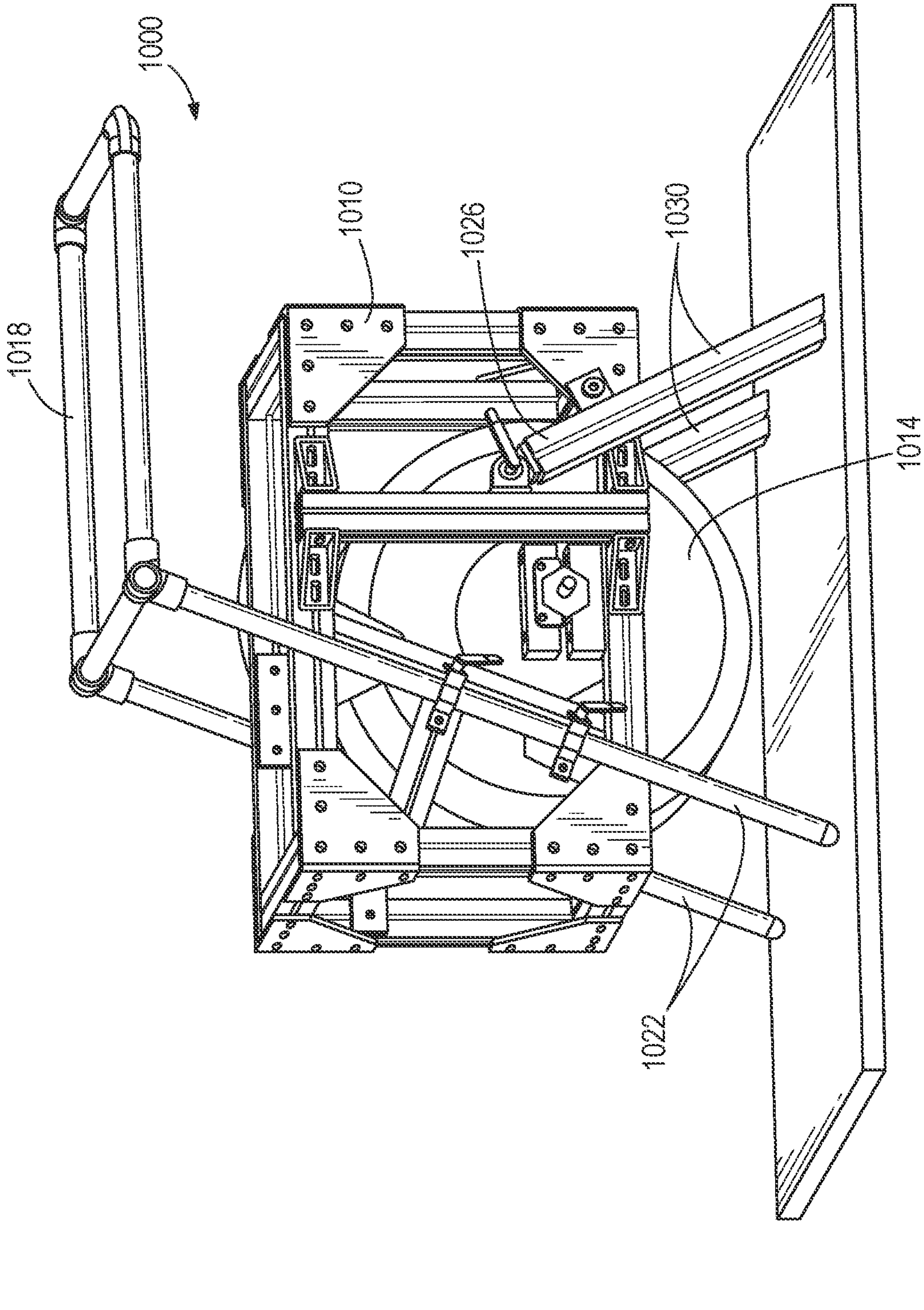
FIG. 15 is a perspective view of another sewer cleaning machine including a rotatable drum and a frame in an operational mode.
Figure 16:
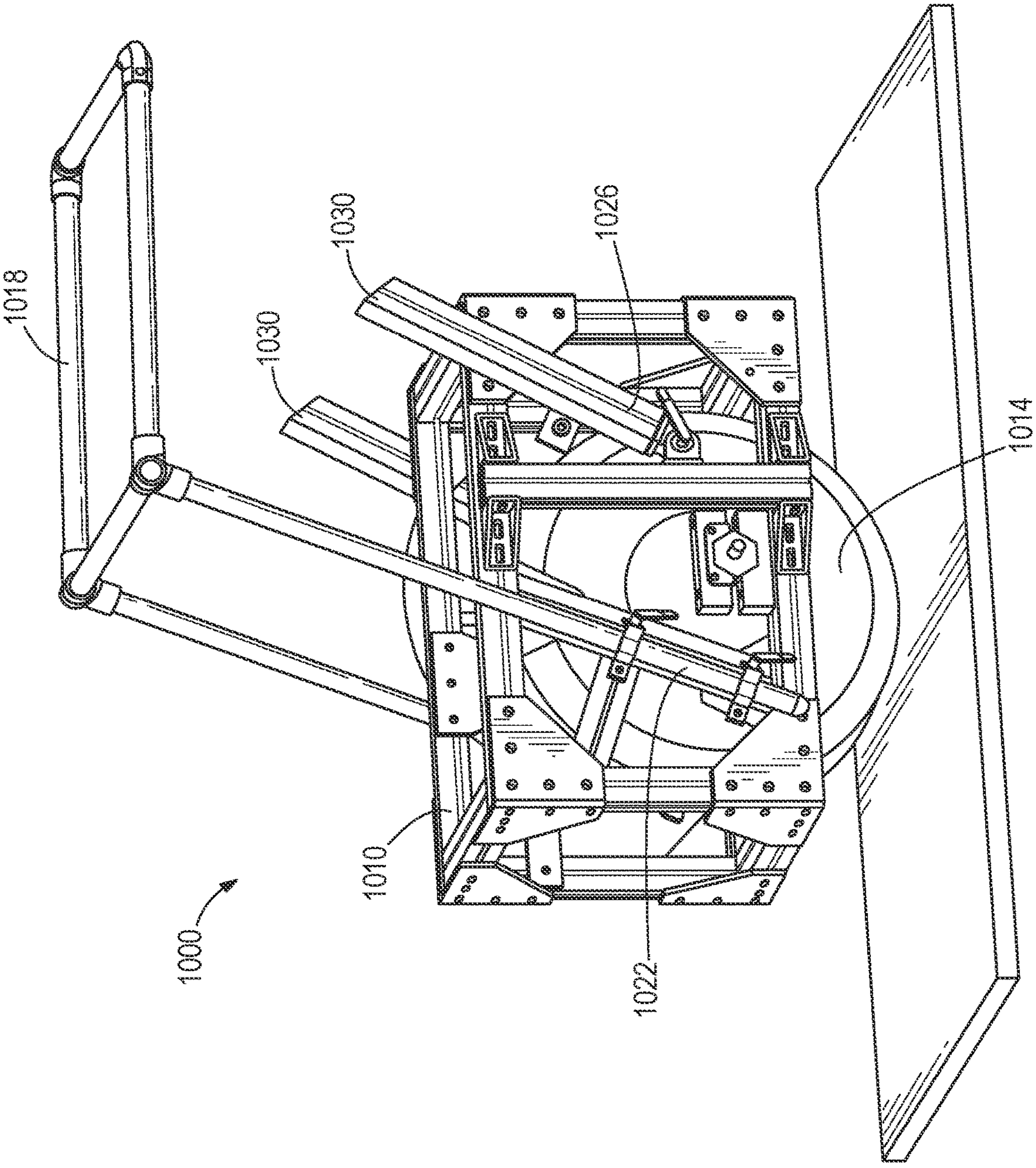
FIG. 16 is a perspective view of the sewer cleaning machine of FIG. 15 in a transport mode.

FIGS. 15 and 16 illustrate another sewer cleaning machine 1000 including a frame 1010 and a drum 1014 supported by the frame 1010. The frame 1010 includes a handle 1018, front legs 1022, and a rear kickstand 1026. The front legs 1022 are retractable by, for example, translating, sliding, or telescoping relative to the drum 1014. The rear kickstand 1026 includes two legs 1030 that are pivotable relative to the drum 1014. When the front legs 1022 are extended and the kickstand 1030 is lowered (as shown in FIG. 15), the front legs 1022 and the kickstand 1026 support the drum 1014 off of the ground in an operational mode. When the front legs 1022 are retracted and the kickstand 1026 is raised (as shown in FIG. 16), the drum 1014 contacts the ground to act like a wheel in a transport mode.

Figure 17:
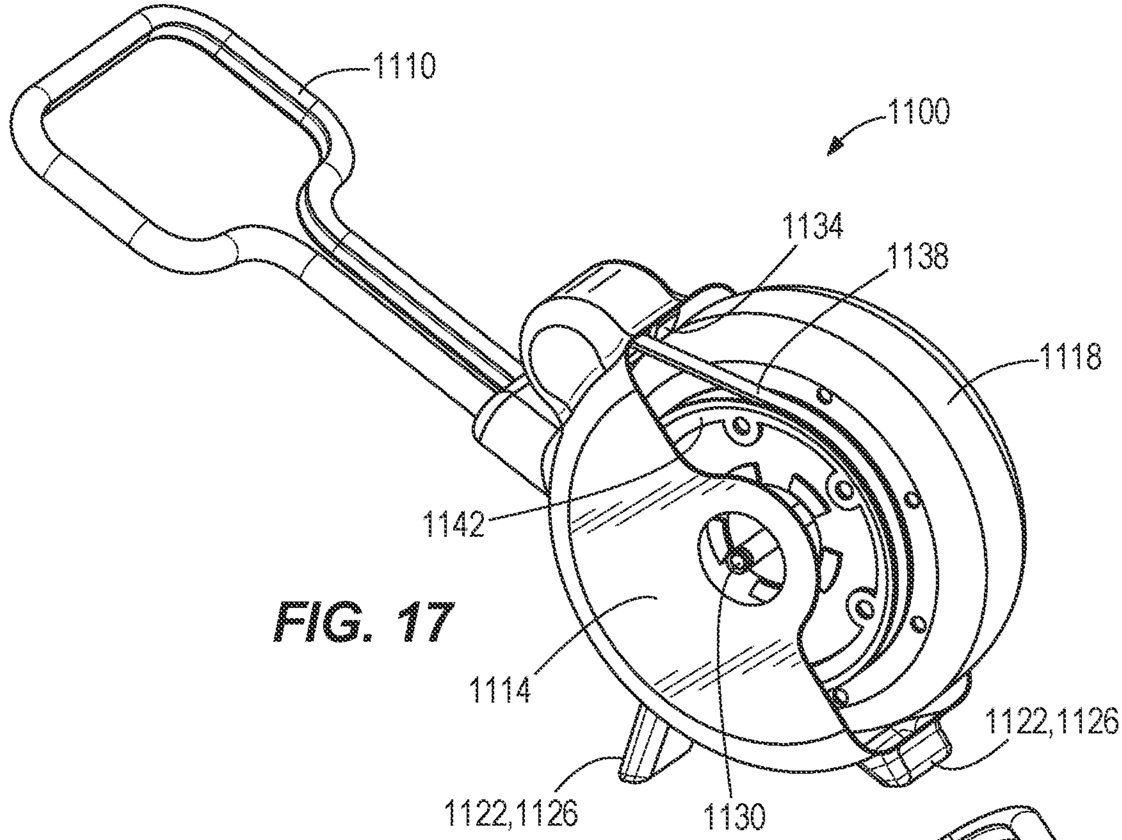
FIG. 17 is a perspective view of another sewer cleaning machine in an operational mode.
Figure 18:
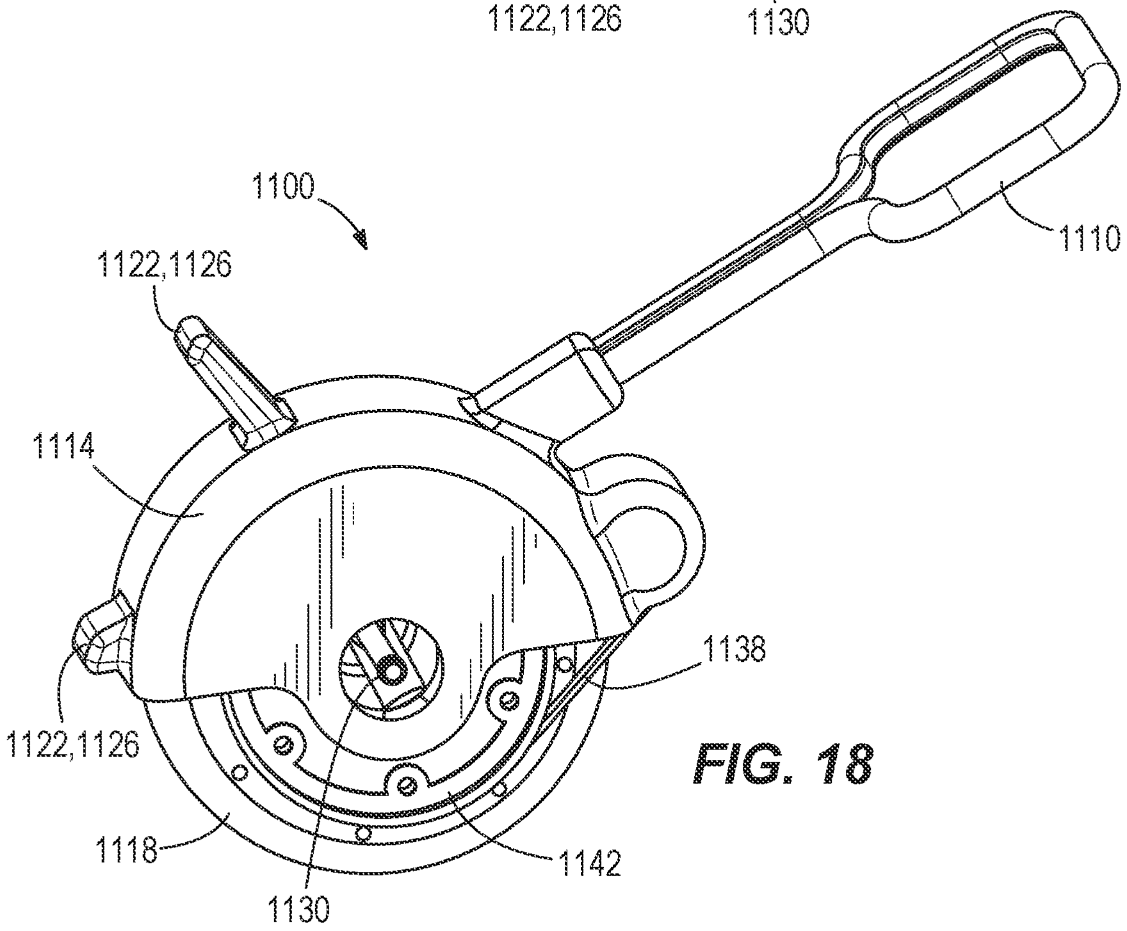
FIG. 18 is a perspective view of the sewer cleaning machine of FIG. 17 in a transport mode.

FIGS. 17 and 18 illustrate another sewer cleaning machine 1100 including a handle 1110, a shroud 1114, and a rotatable drum 1118. The handle 1110 is elongated and extends outwardly from the shroud 1114. The shroud 1114 surrounds a portion of the drum 1118 and includes a stand 1122 to support the sewer cleaning machine 1100 when in an operational mode. In the illustrated embodiment, the stand 1122 includes two legs 1126 (e.g., a front leg and a back leg) that extends radially outward. The drum 1118 is rotatably supported within the shroud 1114 by a shaft 1130 extending through the center of the drum 1118. A motor 1134 can be housed within a portion of the shroud 1114 and can be configured to drive rotation of the drum 1118. The motor 1134 can rotate the drum 1118 through, for example, a belt drive 1138 and a hub 1142 system. The sewer cleaning machine 1100 can be moved (e.g., rotated) between an operational mode, shown in FIG. 17, and a transport mode, shown in FIG. 18. When the handle 1100 and the shroud 1114 are rotated relative to the drum 1118 in a first direction, the legs 1126 of the shroud 1114 engage the ground to support the sewer cleaning machine 1100 in the operational mode. To convert the sewer cleaning machine 1100 to the transport mode, the handle 1110 and the shroud 1114 are rotated relative to the drum 1118 in a second direction so that the drum 1118 engages the ground and functions as a wheel for transport. As such, the handle 1110 is simply rotated forward or backward by a user to switch between the operational and transport modes. While in the operational mode, the handle 1110 may also slide, telescope, or rotate out of the way so the user can more easily access the drum 1118.

FIGS. 19-22 illustrate another sewer cleaning machine 1200 including a frame 1210, a drum housing 1214, a motor housing 1218, a power supply 1222, and a track 1226. The frame 1210 includes a handle 1230, a base 1234 that supports the drum housing 1214, and wheels 1238. A drum 1242 is rotatably supported within the drum housing 1214 and includes a cable (not shown) that is extendable out of an opening 1246 on the drum 1242. The cable is extendable out of the drum with a cable drive device 1250. A first motor 1254 is supported within the motor housing 1218 and is coupled to the drum 1242. The first motor 1254 is operable to rotate the drum 1242. Rotation of the drum 1242 creates friction between an inner surface of the drum 1242 and the cable, which causes the cable to spin to facilitate clearing debris from a drain pipe or another conduit.

In the illustrated embodiment, the track 1226 includes a substantially horizontal drive shaft 1258 with a first drive roller 1262 at one end and a second drive roller 1266 at another end. A first endless belt 1270 extends around the first drive roller 1262 and a first idler roller 1274 and a second endless belt 1278 extends around the second drive roller 1266 and a second idler roller 1282. The endless belts 1270, 1278 extend substantially vertical along a length of the frame 1210. In some embodiments, the endless belts 1270, 1278 include traction that assists in gripping a surface, ledge, or other object.

Figure 21:
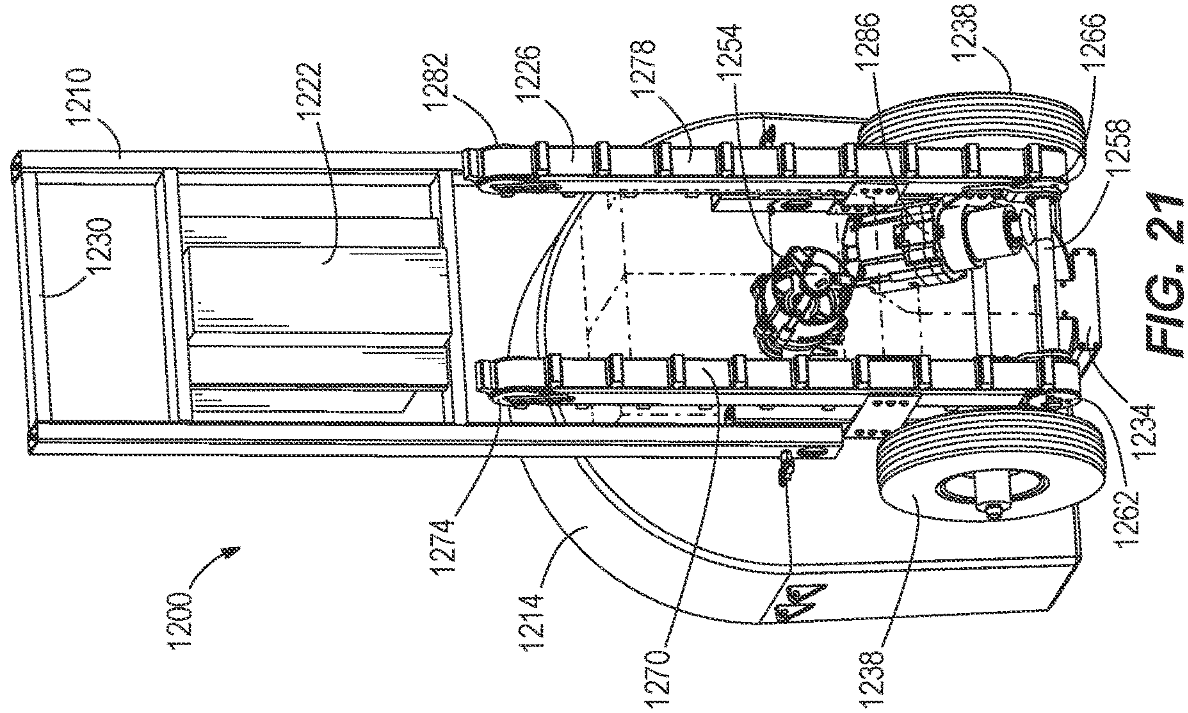
FIG. 21 is a rear perspective view of the sewer cleaning machine of FIG. 19 with a motor housing removed.

As shown in FIG. 21, a second motor 1286 is supported by the frame 1210 and is coupled to the drive shaft 1258 of the track 1226. The second motor 1286 is operable to rotate the drive shaft 1258 and thus the drive rollers 1262, 1266 to facilitate rotation of the endless belts 1270, 1278. In the illustrated embodiment, both the first and second motors 1254, 1286 are powered by the power supply 1222 that is supported on the frame 1210. In some embodiments, the power supply 1222 may be coupled to a power outlet to provide A/C power to the sewer cleaning machine 1200. In other embodiments, the power supply 1222 may include a battery receptacle that receives a battery pack to provide D/C power to the sewer cleaning machine 1200. In further embodiments, the power supply 1222 may receive more than one battery pack to power the drain cleaner. Although not shown, the power supply 1222 includes a controller that may control operation of the first and second motors 1254, 1286. Additionally, the power supply 1222 may include switches, buttons, a user interface, or other control features that allow a user to selectively control the sewer cleaning device 1200.

Figure 20:
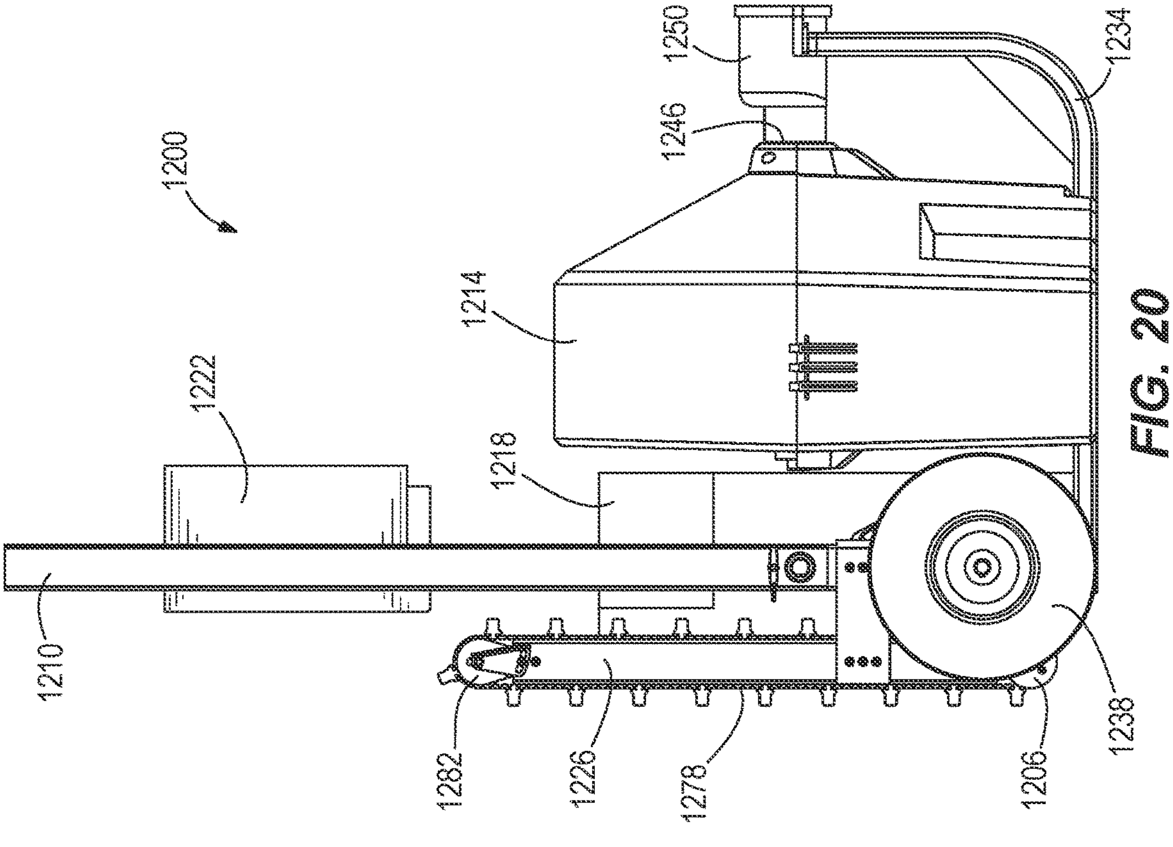
FIG. 20 is a side view of the sewer cleaning machine of FIG. 19.
Figure 22:
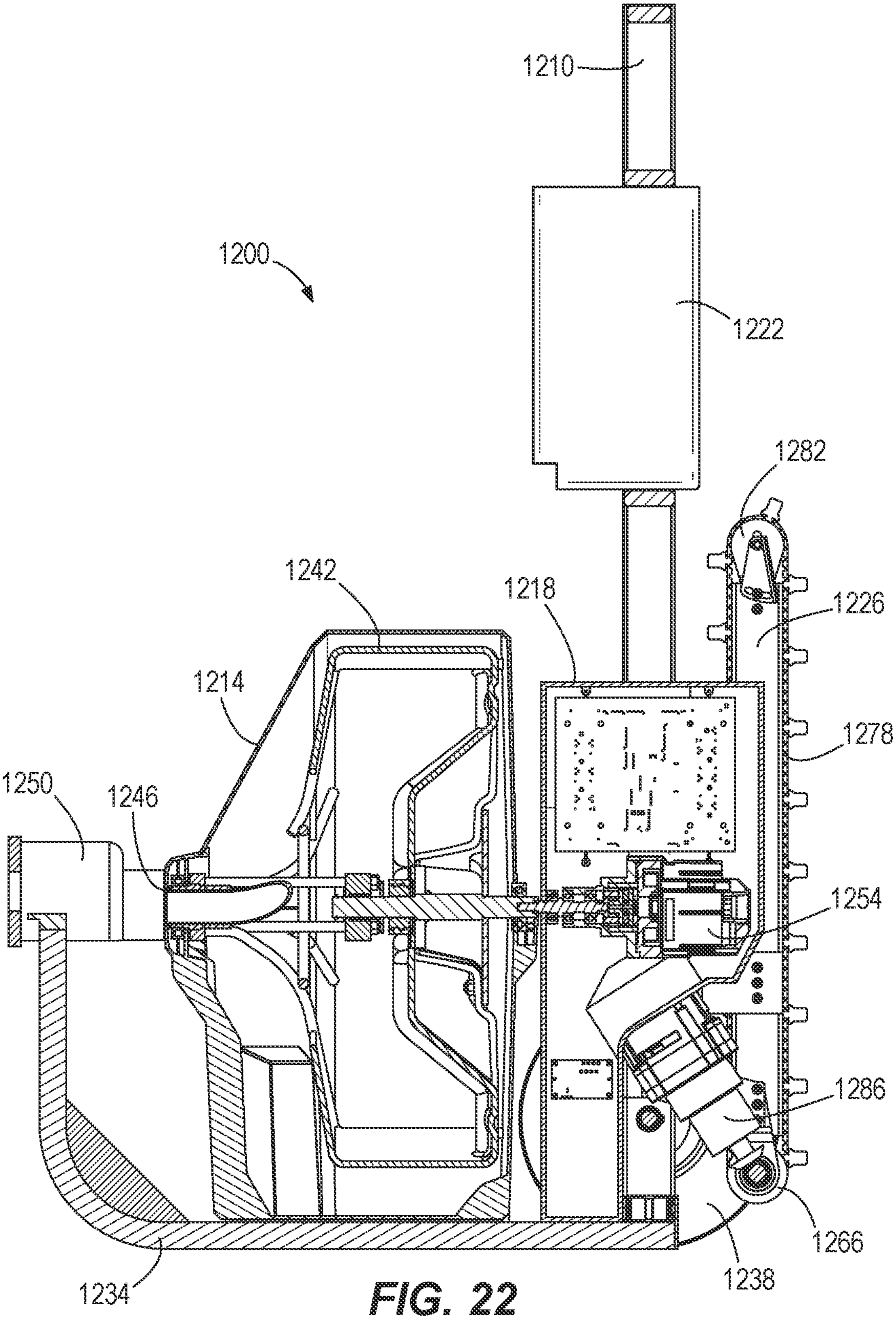
FIG. 22 is a cross-sectional view of the sewer cleaning machine of FIG. 19.

With reference to FIGS. 20-22, the sewer cleaning machine 1200 is shown in a first operational position. In this position, the drum housing 1214 of the sewer cleaning machine 1200 is supported on a surface to facilitate the clearing of debris from a conduit. In operation, the power supply 1222 supplies power to the first motor 1254 to spin the drum 1242. The cable drive device 1250 draws cable from inside the drum 1242 so that a user may extend the cable into a drain. Rotation of the drum 1242 causes the cable to spin assisting in the removal of debris from the drain.

Figure 19:
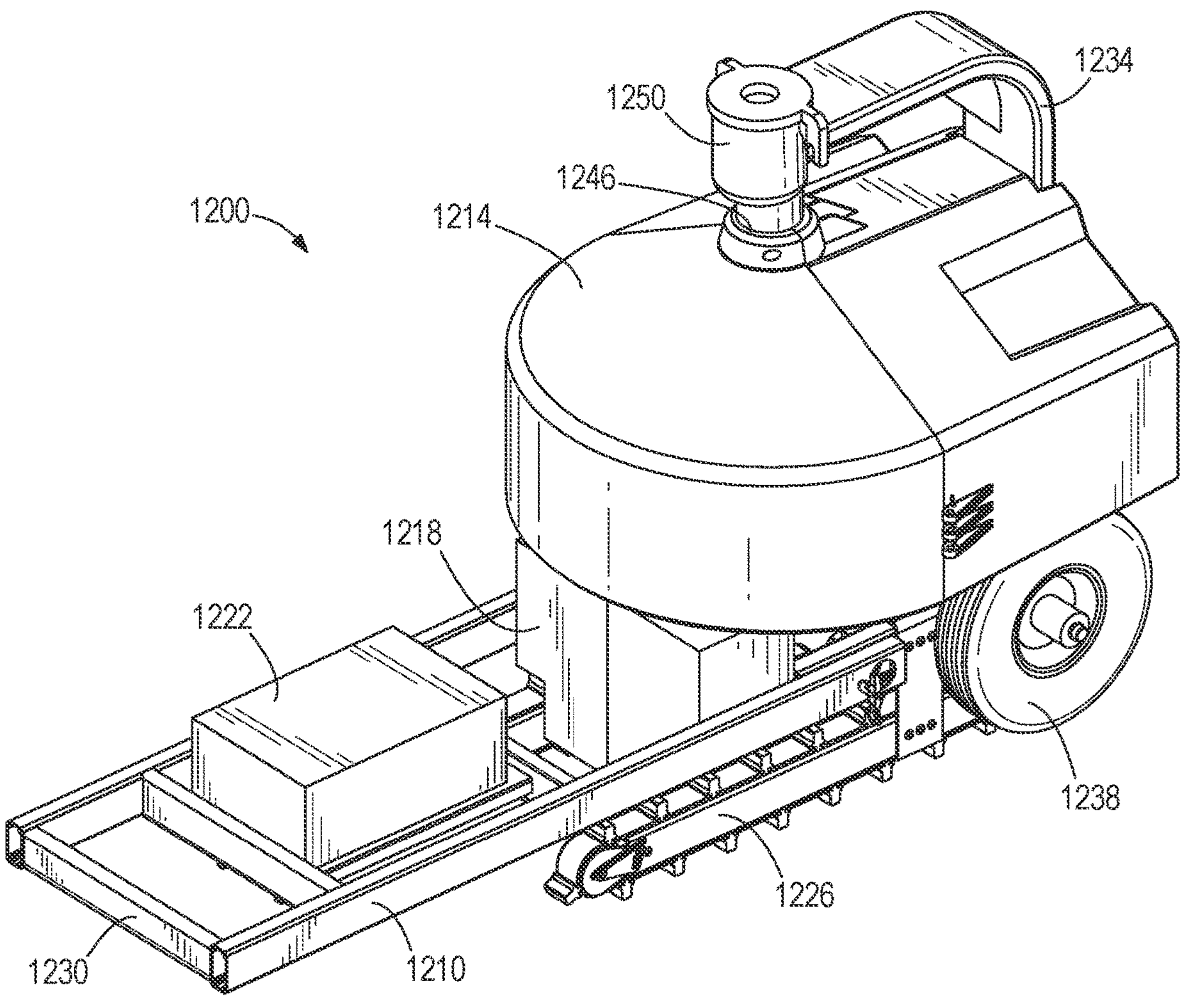
FIG. 19 is a front perspective view of another sewer cleaning machine.

With reference to FIG. 19, the sewer cleaning machine 1200 is shown in a second transport position. A user may tilt the frame 1210, lifting the housing 1214 off of a surface and allowing the wheels 1238 to transport the sewer cleaning machine 1200 along the surface. However, due to the weight, the sewer cleaning machine 1200 may be difficult to lift. Specifically, a user may have difficulty transporting the sewer cleaning machine 1200 on stairs. During transportation, the track 1226 may assist in lifting the sewer cleaning machine 1200 both up and down stairs. A user may first position the sewer cleaning device 1200 so that the track 1226 engages the stairs. Once the track 1226 engages the stairs, the user can control the power supply 1222 to operate the second motor 1286. The second motor 1286 rotates the drive shaft 1258 rotating the endless belts 1270, 1278. As the endless belts rotate 1270, 1278, the traction on the belts 1270, 1278 assist in pulling the sewer cleaning machine 1200 up the stairs. Meanwhile, the user can also assist by pulling on the handle 1230 of the sewer cleaning device 1200. To transport the sewer cleaning device 1200 down stairs, a user can control the second motor 1286 to rotate the track 1226 in the opposite direction.

Although the invention is described with reference to discrete embodiments of the sewer cleaning machines, variations of the sewer cleaning machines exist within the spirit and scope of the invention. For example, features of one sewer cleaning machine may be used in combination with features of other sewer cleaning machines.

Various features and advantages of the invention are set forth in the following claims.

What is claimed is:

1. A sewer cleaning machine comprising:
- a frame;
- a drum rotatably supported by the frame, the drum including a cable that is selectively extendable out of the drum; and
- a motor supported by the frame and coupled to the drum, the motor operable to rotate the drum;
- wherein the drum is configured to engage a surface to facilitate moving the sewer cleaning machine along the surface, and
- wherein the drum includes a tread to help grip the surface.

2. The sewer cleaning machine of claim 1, wherein the drum is rotated by the motor while in engagement with the surface to function as a powered wheel.

3. The sewer cleaning machine of claim 1, wherein the frame includes a handle to control the sewer cleaning machine along the surface.

4. The power cleaning machine of claim 3, wherein the handle includes a lever to actuate the motor to rotate the drum while in engagement with the surface to function as a powered wheel.

5. The sewer cleaning machine of claim 1, wherein the tread is selectively extensible from the drum.

6. The sewer cleaning machine of claim 1, further comprising a handle rotatably coupled to the drum.

7. A sewer cleaning machine comprising:
- a frame;
- a drum rotatably supported by the frame, the drum including a cable that is selectively extendable out of the drum; and
- a motor supported by the frame and coupled to the drum, the motor operable to rotate the drum;
- wherein the drum is configured to engage a surface to facilitate moving the sewer cleaning machine along the surface, and
- wherein the frame includes a shroud that surrounds a portion of the drum.

8. The sewer cleaning machine of claim 7, wherein the shroud includes a stand to selectively support the drum above the surface.

9. The sewer cleaning machine of claim 8, wherein the shroud further includes a handle to control the drum when the drum engages the surface.

10. A sewer cleaning machine comprising:
- a frame;
- a drum rotatably supported by the frame, the drum including a cable that is selectively extendable out of the drum; and
- a motor supported by the frame and coupled to the drum, the motor operable to rotate the drum;

wherein the drum is rotatable relative to the frame to cause the sewer cleaning machine to move between a first location and a second location.

11. The sewer cleaning machine of claim 10, wherein the motor rotates the drum along a surface to move the drum between the first location and the second location.

12. The sewer cleaning machine of claim 11, wherein the frame includes a handle to control the sewer cleaning machine during movement between the first location and the second location.

13. The power cleaning machine of claim 12, wherein the handle includes an actuator operable to activate the motor to rotate the drum while in engagement with the surface to function as a powered wheel.

14. The sewer cleaning machine of claim 10, further comprising a handle rotatably coupled to the drum.

15. A sewer cleaning machine comprising:

a frame;

a drum rotatably supported by the frame, the drum including a cable that is selectively extendable out of the drum;

a motor supported by the frame and coupled to the drum, the motor operable to rotate the drum; and a handle extending outwardly from the frame, the handle being movable relative to the drum between a transport mode and an operational mode wherein the drum is configured to rotate along a surface when the handle is in the transport mode to cause the sewer cleaning machine to move along the surface.

16. The sewer cleaning machine of claim 15, wherein the drum is rotated by the motor while in engagement with the surface to function as a powered wheel.

17. The sewer cleaning machine of claim 16, wherein the handle includes an actuator operable to activate the motor to rotate the drum while in engagement with the surface to function as a powered wheel.

18. The sewer cleaning machine of claim 15, wherein the handle extends from a main body of the frame at a location near a perimeter of the drum.

19. The sewer cleaning machine of claim 15, wherein the handle includes a grip having powered controls to assist with movement of the drum along the surface.

* * * * *